United States Patent [19]

Uotani

[11] Patent Number: 5,553,211
[45] Date of Patent: Sep. 3, 1996

[54] OVERLAPPING GRAPHIC PATTERN DISPLAY SYSTEM

[75] Inventor: Akira Uotani, Kanagawa, Japan

[73] Assignee: Fuji Xerox Co., Ltd., Tokyo, Japan

[21] Appl. No.: 425,242

[22] Filed: Apr. 17, 1995

Related U.S. Application Data

[63] Continuation of Ser. No. 914,557, Jul. 17, 1992, abandoned.

[30] Foreign Application Priority Data

Jul. 20, 1991 [JP] Japan ................................. 3-204920

[51] Int. Cl.$^6$ .................................................. G06F 3/153
[52] U.S. Cl. ........................................ 395/135; 395/138
[58] Field of Search ................................. 395/135, 138, 395/155, 161

[56] References Cited

U.S. PATENT DOCUMENTS

| | | | |
|---|---|---|---|
| 4,434,467 | 2/1984 | Scott | 395/135 X |
| 4,847,788 | 7/1989 | Shimada | 395/135 X |
| 5,022,085 | 6/1991 | Cok | 395/135 X |
| 5,271,097 | 12/1993 | Barker et al. | 395/135 |
| 5,283,867 | 2/1994 | Bayley et al. | 395/135 X |
| 5,293,470 | 3/1994 | Birch et al. | 395/135 |
| 5,325,482 | 6/1994 | Bormans | 395/135 X |

FOREIGN PATENT DOCUMENTS

| | | |
|---|---|---|
| 63-126071 | 5/1988 | Japan . |
| 63-126072 | 5/1988 | Japan . |
| 1-227182 | 9/1989 | Japan . |
| 1-258183 | 10/1989 | Japan . |

OTHER PUBLICATIONS

"Computer Handling of Geographical Data," R. F. Tomlmson et al., 4 The Canada Geographic Information System, pp. 26–73, UNESCO Press, 1976.

*Primary Examiner*—Heather R. Herndon
*Assistant Examiner*—Cliff N. Vo
*Attorney, Agent, or Firm*—Finnegan, Henderson, Farabow, Garrett & Dunner, L.L.P.

[57] ABSTRACT

A graphic display system is provided with: a memory unit for storing graphic data having a plural number of graphic layers composed of a plural number of graphic elements accorded respectively with attribute information; a displaying unit for displaying the graphic data; and a selecting unit for selecting the graphic layers to be displayed on the displaying unit. A setting unit is provided for each of the graphic layers and setting the display attributes for the display of the individual graphic elements on the graphic layer with the displaying unit. A display control unit reads the graphic layers, as selected by the selecting unit out of the memory unit, and displays the graphic layers, thus read out, in overlapping relationship on the display screen of the displaying unit based on the results set up by the setting unit.

18 Claims, 30 Drawing Sheets

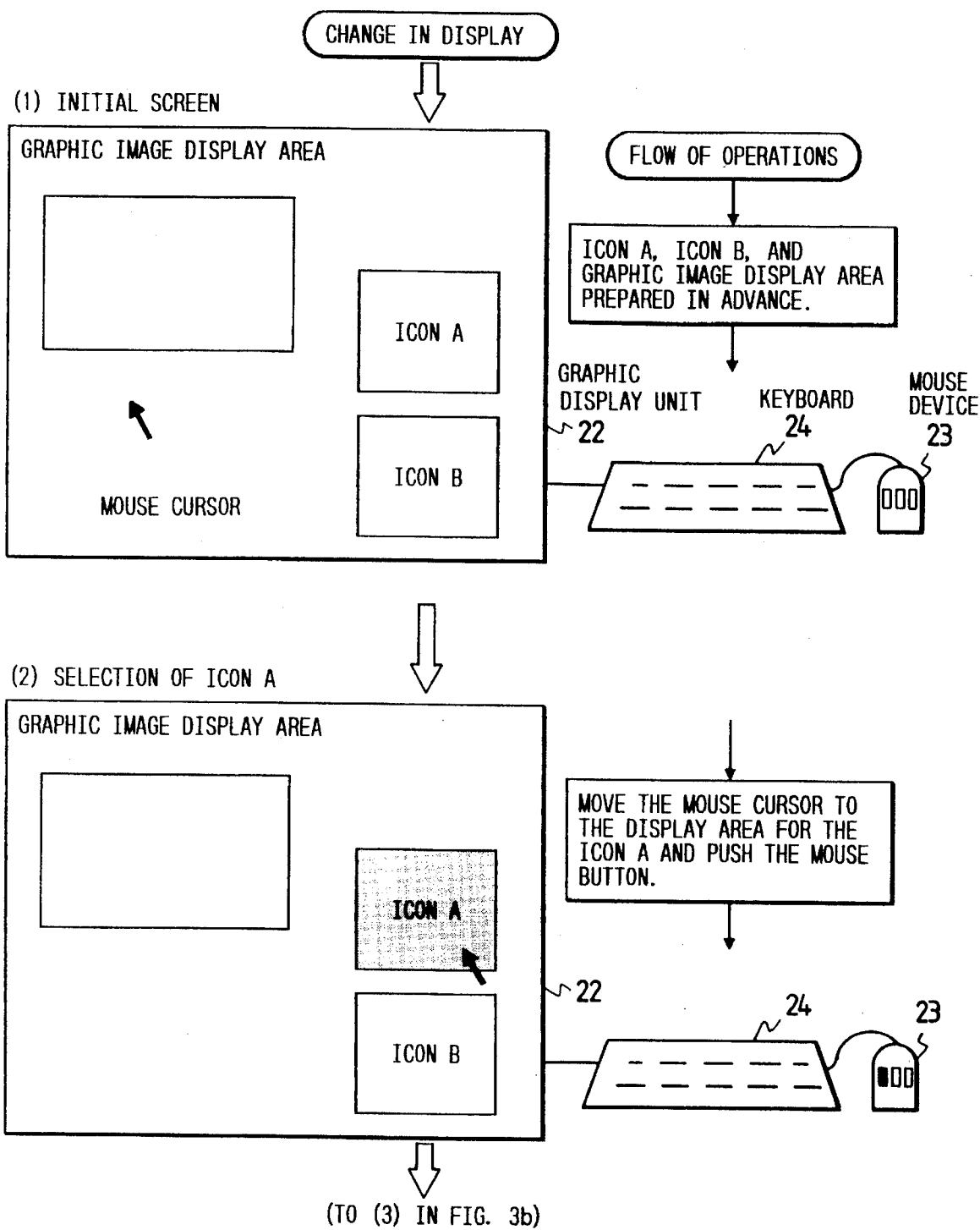

FIG. 3b
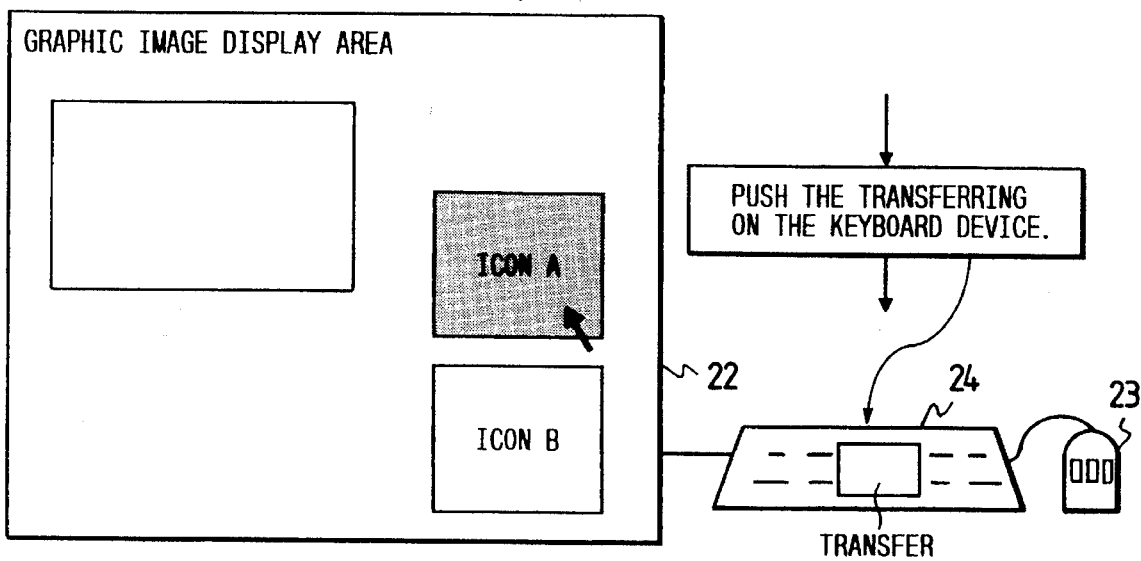
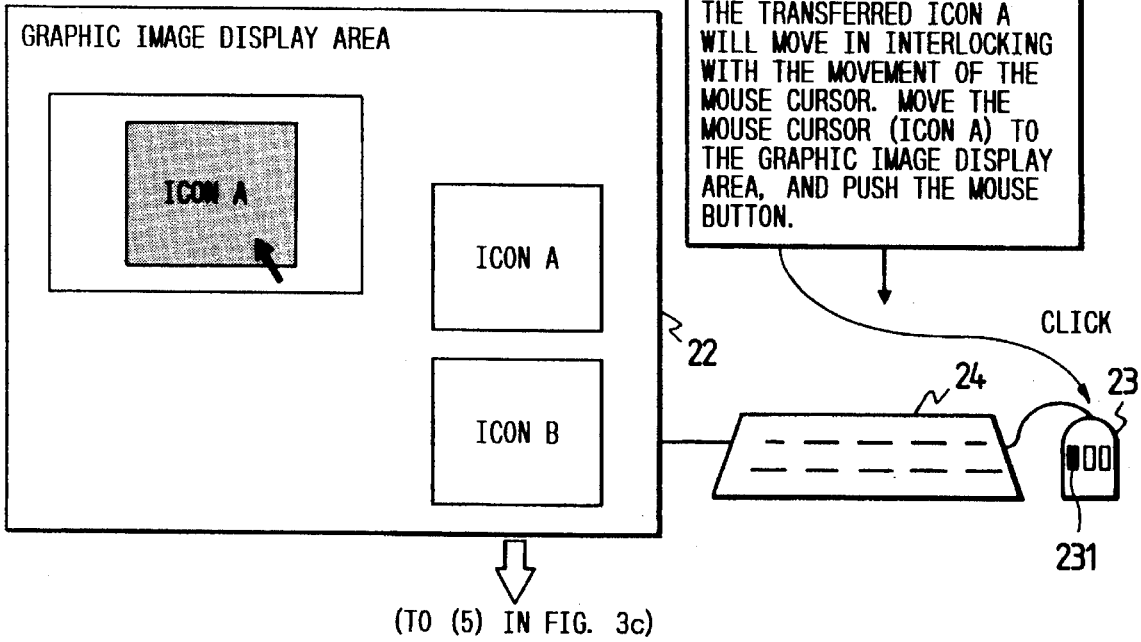

FIG. 3d
(FROM (6) IN FIG. 3c)
(7) INSTRUCTIONS FOR TRANSFERRING OPERATION FOR ICON B
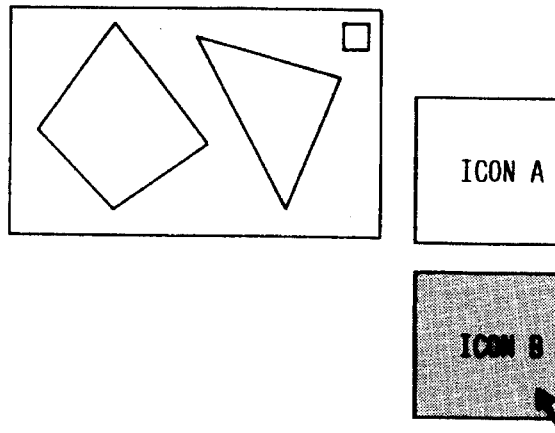
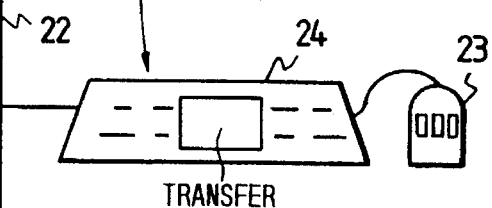
PUSH THE TRANSFERRING BUTTON ON THE KEYBOARD.
TRANSFER
(8) SELECTION OF GRAPHIC IMAGE DISPLAY AREA
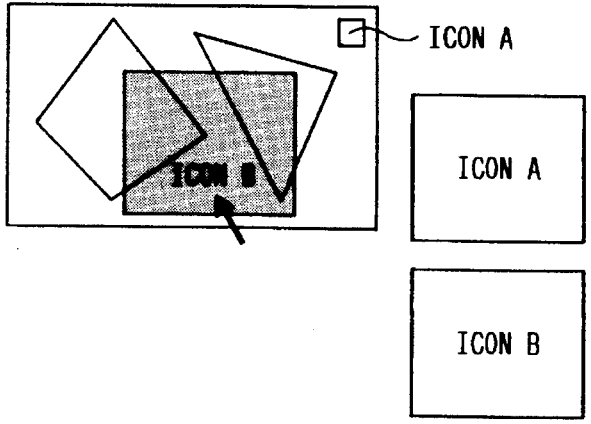
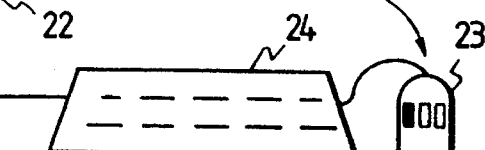
THE TRANSFERRED ICON B WILL MOVE IN INTERLOCKING WITH THE MOVEMENT OF THE MOUSE CURSOR.
MOVE THE MOUSE CURSOR (NAMELY, THE ICON B) TO THE GRAPHIC IMAGE DISPLAY AREA, AND PUSH THE MOUSE BUTTON.
(TO (9) IN FIG. 3e)

FIG. 3e (FROM (8) IN FIG. 3d)

THE TRANSFERRED ICON B IS PUT ON DISPLAY IN ITS REDUCED FORM ABOVE THE ICON A DISPLAYED IN ITS REDUCED FORM IN THE UPPER RIGHT CORNER OF THE GRAPHIC IMAGE DISPLAY AREA, AND THE GRAPHIC INFORMATION B, TO WHICH THE ICON B POINTS, IS DRAWN AS GRAPHIC IMAGES, IN OVERLAPPING WITH THE ALREADY DRAWN GRAPHIC INFORMATION A, IN THE GRAPHIC IMAGE DISPLAY AREA.

(9) DISPLAY OF GRAPHIC INFORMATION B IN OVERLAPPING WITH GRAPHIC INFORMATION A

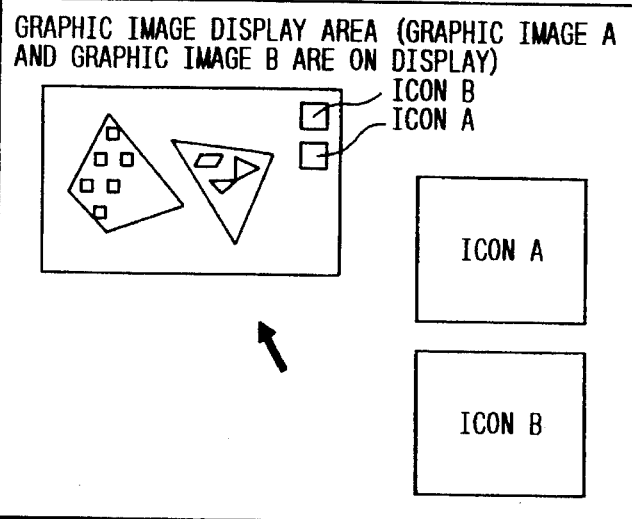

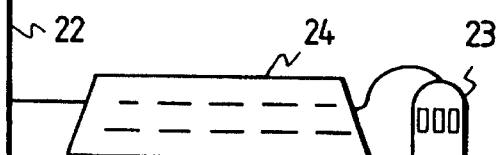

(10) SELECTION OF ICON A IN GRAPHIC IMAGE DISPLAY AREA

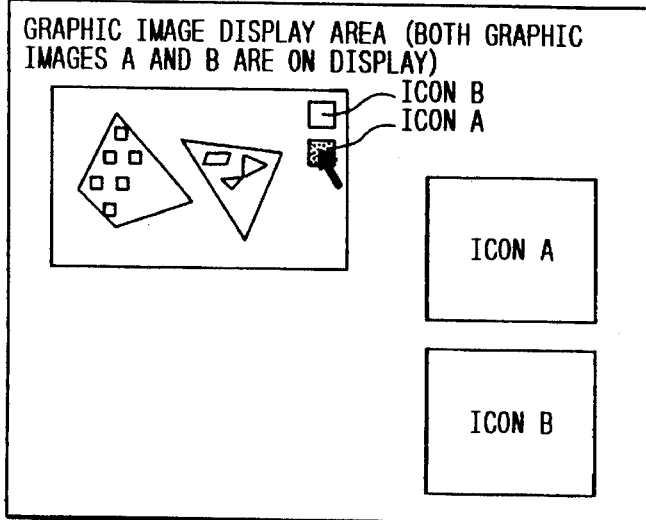

MOVE THE MOUSE CURSOR TO THE DISPLAY AREA FOR THE REDUCED ICON A LOCATED IN THE UPPER RIGHT CORNER IN THE GRAPHIC IMAGE DISPLAY AREA, AND PUSH THE MOUSE BUTTON.

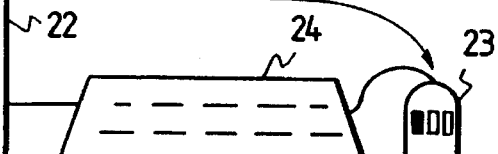

(TO (11) IN FIG. 3f)

FIG. 3f
(FROM (10) IN FIG. 3e)
(11) START OF GRAPHIC
INFORMATION CONDITION
SETTING FUNCTION 14
FOR ICON A IN GRAPHIC
IMAGE DISPLAY AREA
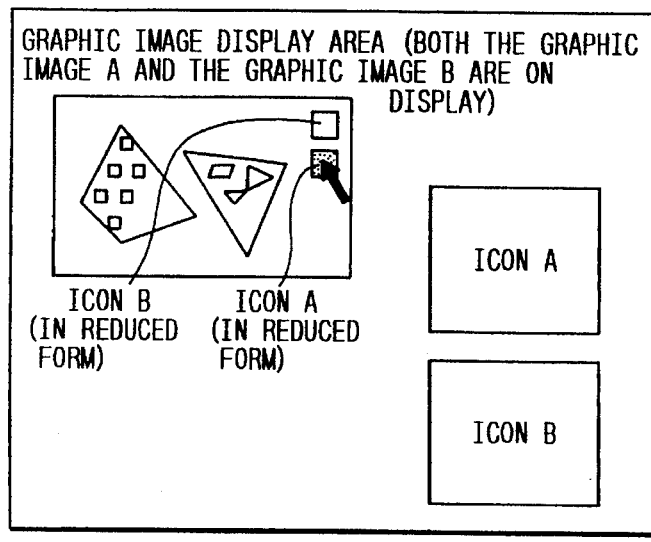
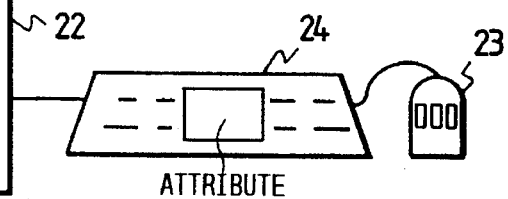
(12) SETUP OF CONDITION (1)
BY GRAPHIC INFORMATION
CONDITION SETTING MEANS 14
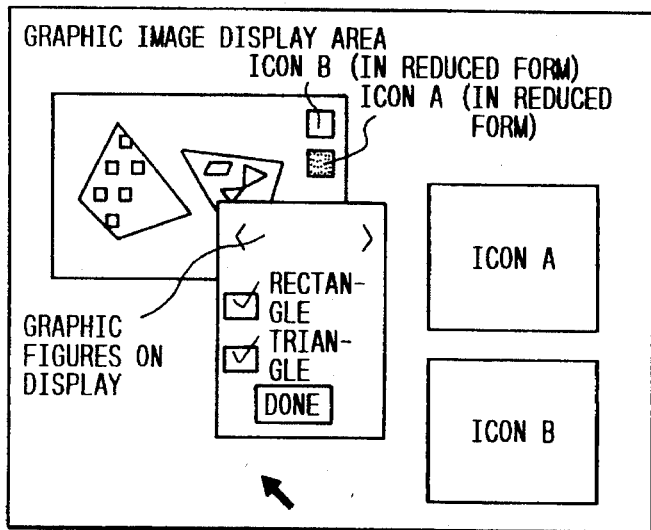
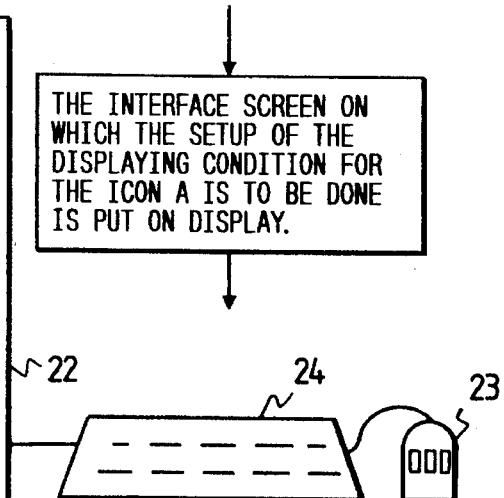
(TO (13) IN FIG. 3g)

FIG. 3g
(FROM (12) IN FIG. 3f)
(13) SETUP OF CONDITION (2)
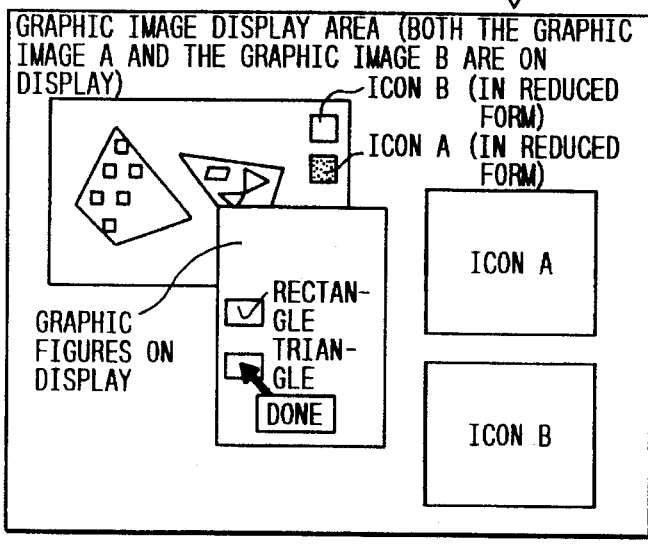
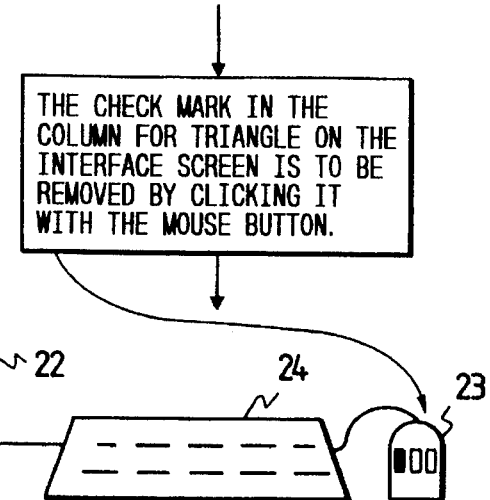
THE CHECK MARK IN THE COLUMN FOR TRIANGLE ON THE INTERFACE SCREEN IS TO BE REMOVED BY CLICKING IT WITH THE MOUSE BUTTON.
(14) SETUP OF CONDITION (3)
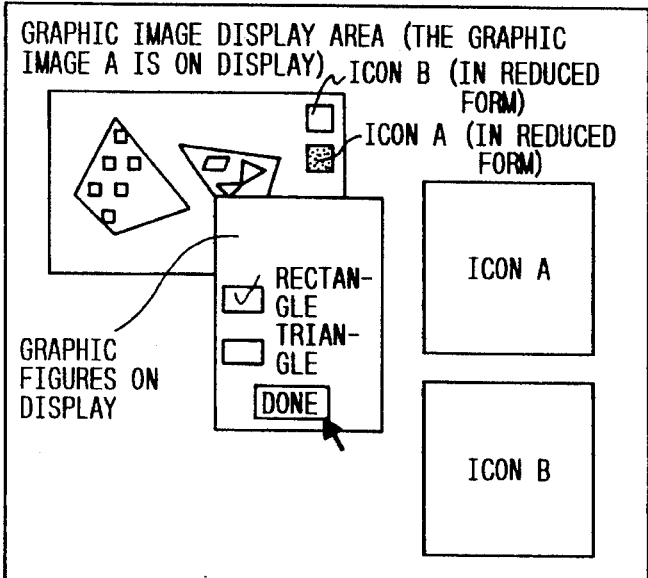
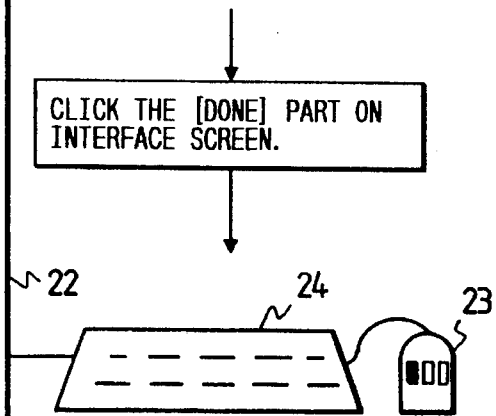
CLICK THE [DONE] PART ON INTERFACE SCREEN.
(TO (15) IN FIG. 3h)

FIG. 14

ICON DISPLAYING FUNCTION : GRAPHIC INFORMATION DISPLAY CONDITION SETTING FUNCTION

| CLASS NAME | CLASS LAYER | FUNCTION | CLASS VARIABLE | | INSTANCE VARIABLE | |
|---|---|---|---|---|---|---|
| | | | NAME | MEANING (CONTENTS) | NAME | MEANING (CONTENTS) |
| MapLayer | Object Model <u>MapLayer</u> | MAP INFORMATION FORMED INTO A HIERARCHICAL STRUCTURE | | | name | JAPANESE NAME OF HIERARCHICAL LAYER (aString) |
| | | | | | eName | ROMANIZED CHARACTERS OF NAME (aString) |
| | | | | | areaClt | COLLECTION OF GRAPHIC IMAGE TYPES TO BE DRAWN (anOrderedCollection) |
| | | | | | defaultareaClt | DEFAULT VALUE OF AreaClt (anOrderedCollection) |
| | | | | | group | TYPES OF HIERARCHICAL LAYERS (aSimbol) |
| MapLayerIcon | Object Model MapLayer <u>MapLayerIcon</u> | ICON HAVING MAP INFORMATION FORMED INTO A HIERARCHICAL STRUCTURE | IconForm | AN ICON PICTURE (aColorForm) | label | ICON LABEL CHARACTERS (aTwobyteString) |
| | | | TextRect | A CLIPPING AREA (aRectangle) FOR THE CHARACTERS TO BE DISPLAYED IN AN ICON | isCollapsed | STATUS INDICATING WHETHER THE ICON STATE IS PRESENT (aBoolean) |
| IconView | Object View <u>IconView</u> | A VIEW IN A CLOSED STATE IS OFFERED AS AN IconView | | | iconText | ICON LABEL TEXT (aParagraph) |
| | | | | | isReversed | STATUS INDICATING WHETHER THE ICON LABEL TEXT IS DISPLAYED IN REVERSE (aBoolean) |

FIG. 15a

ICON OR GRAPHIC IMAGE DISPLAY AREA SELECTING AND OPERATION INSTRUCTION FUNCTION

| CLASS NAME | CLASS LAYER | FUNCTION | CLASS VARIABLE | | INSTANCE VARIABLE | |
|---|---|---|---|---|---|---|
| | | | NAME | MEANING (CONTENTS) | NAME | MEANING (CONTENTS) |
| InputSensor | Object<br>InputSensor | THIS FUNCTION OFFERS THE FUNCTION FOR SERVING AS AN INTERFACE FOR THE INPUT FROM THE DEVICES | Current-Cursor | CURSOR CURRENTLY DISPLAYED ON THE SCREEN (aCursor) | | |
| | | | CurrentInput-State | aInputState FOR MAKING ACCESS TO THE HARDWARE | | |
| ControlManager | Object<br>ControlManager | THIS FUNCTION CONTROLS THE SCHEDULE FOR THE VIEW ON THE SCREEN | Inrerrupt-LockSignal | SIGNAL (aSignal) FOR RECEIVING #interruptName | Scheduled-Controllers | SCHEDULED CONTROLLER (anOrderedCollection) |
| | | | LastDisplay-Extert | SCREEN SIZE (aPoint) | Active-Controller | ACTIVE CONTROLLER (aController) |
| | | | | | Active-Controller-Process | (aProcess) |
| | | | | | Screen-Controller | SCREEN CONTROLLER (aScreenController) |
| | | | | | InterruptLock | FLAG FOR INDICATING WHETHER OR NOT AN INTERRUPT SIGNAL IS TO BE RECEIVED (aBoolean) |

FIG. 15b

| CLASS NAME | CLASS LAYER | FUNCTION | CLASS VARIABLE | | INSTANCE VARIABLE | |
|---|---|---|---|---|---|---|
| | | | NAME | MEANING (CONTENTS) | NAME | MEANING (CONTENTS) |
| StandardSystem-Controller | Object Controller | CONTROLLER FOR StandardSystem-View | MenuWhenCollapsed | MENU FOR COLLAPSED STATE (anActionMenu) | Status | SHOWS THE STATE OF VIEW (aSymbol) |
| | MouseMenu-Controller | THIS FUNCTION OFFERS OPERATING MENUS FOR SUCH OPERATIONS AS MOVING AND FRAMING | RedIsBlueInTab | FLAG FOR DISPLAY-ING A MENU WITH TitleTab (aBoolean) | labelForm | LABEL PICTURE (aForm) |
| | standard System -Controller | | ScheduledBlue-ButtonMenu | MENU FOR PERFORMING VIEW OPERATIONS (aPopUpMenu) | viewForm | VIEW PICTURE (aForm) |
| | | | ScheduledBlue-ButtonMessagers | MENU MESSAGES FOR PERFORMING VIEW OPERATIONS (anArray) | | |
| IconController | Object Controller MouseMenu-Controller Icon-Controller | CONTROLLER FOR IconView | IconYellowButton-Menu | MENU (aPopUpMenu) | | |
| | | | IconYellowButton-Messages | MENU MESSAGES (anArray) | | |

FIG. 16

GRAPHIC INFORMATION DISPLAY FUNCTION

| CLASS NAME | CLASS LAYER | FUNCTION | CLASS VARIABLE | | INSTANCE VARIABLE | |
|---|---|---|---|---|---|---|
| | | | NAME | MEANING (CONTENTS) | NAME | MEANING (CONTENTS) |
| MouseScroll-Controller | Object<br>Controller<br>MouseMenu<br>-Controller<br>2dScroll<br>-Controller<br>MouseScroll<br>-Controller | CONTROLLER FOR ScrollView | | | | |
| ScrollView | Object<br>View<br>FormView<br>ScrollView | TO DISPLAY A GRAPHIC IMAGE IN ACCORDANCE WITH THE STATE OF THE MapLayer WHICH THE MODEL ATLAS HAS ITS INTERNAL INFORMATION | | | PartMsg<br>acceptMsg<br>menuMsg | A SYMBOL IN WHICH THE MODEL ATLAS IS TO BE PLUGGED IS SET (aSymbol) |
| Atlas | Object<br>Model<br>Atlas | TO PRODUCE A PICTURE DRAWN IN GRAPHIC IMAGE IN ACCORDANCE WITH THE MapLayer ICON UNDER SET CONDITIONS | | | LayerList | THE MAPLAYERS, WHICH ARE THE OBJECT TO BE PUT ON DISPLAY ARE COLLECTED (anOrderedCollection) |

BLOCK DIAGRAM ILLUSTRATING FUNCTIONAL DETAILS OF ICON OR GRAPHIC IMAGE DISPLAY AREA SELECTING AND OPERATION INSTRUCTING FUNCTION

FLOW CHART FOR OPERATIONS FOR CURSOR DISPLAYING FUNCTION

FLOW CHART FOR OPERATIONS FOR ICON OR GRAPHIC IMAGE DISPLAY AREA SELECTING FUNCTION

FLOW CHART FOR TRANSFER OF MapLayerIcon

OVERLAPPING GRAPHIC PATTERN DISPLAY SYSTEM

This application is a continuation, of application Ser. No. 07/914,557 filed Jul. 17, 1992, now abandoned.

BACKGROUND OF THE INVENTION

The present invention relates to a graphic image displaying system for retrieval and display of data composed of attribute information and graphic information respectively formed into a hierarchical structure and particularly to a user interface for use in the overlapping display of graphic attribute information in such a system.

According to the prior art, a graphic information retrieving and displaying system (as disclosed, for example, in the Official Gazettes on Japanese Patent Application Laid Open, No. 126071-1988 (Showa 63), No. 126072-1988 (Showa 63), No. 227182-1989 (Heisei 1), and No. 258183-1989 (Heisei 1)) usually displays a pre-ordered graphic attribute information necessary for the particular application program in overlapping on a base layer (a blank map), which does not show any attribute information at all, in case any graphic attribute information is to be put on display in overlapping. Thus, the overlapping display is achieved when the user gives instructions for the display of graphic attribute information by specifying a particular geographical point on the display screen or by turning ON an appropriate switch provided on the display screen in correspondence with the particular graphic attribute information. That is to say, a display switch block is provided on the outside of a graphic image display block on the display screen, with switches provided on the display switch block in a number corresponding to the items of the graphic attribute information, as shown in FIG. 23, so that the system displays the graphic attribute information for which the switch has thus been turned ON in overlapping on the graphic image display block. In case the graphic information contains many items of graphic attribute information, the number of items of such graphic attribute information will be extremely large in total. This will be true, for example, in case a map information system is in need of map attribute information indicating various areas by the statutory land use classification, which establishes such categories as a first type exclusive housing area, a second type exclusive housing area, an exclusive housing area, an area including any adjacent commercial area, a commercial area, a semi-industrial area, a special industrial area, and so forth, as well as attribute information indicating the types of construction of buildings, such as wooden structures, concrete structures, and ferro-concrete structures, and attribute information indicating the height or number of stories of buildings, such as one story, two stories, and three stories, and any other attribute information necessary for the use of a map.

As the types of graphic attribute information to be put on display are increased in the manner described above, also the number of switches for indicating the display of graphic attribute information in overlapping will increase. For this reason, it will be difficult to accommodate and display a large number of switches, in addition to graphic images, in the limited area of the display screen. In other words, it will be very difficult to materialize a user interface for displaying a plural number of items in overlapping on the display screen because of the limitations experienced in the layout on the system operating screen. Moreover, the state of the AND display used in the overlapping display presents difficulty to the user of such a system in intuitively understanding the display, and, in effect, the feel in the operation of the system will be unfavorable.

SUMMARY OF THE INVENTION

The present invention achieves improvements through its elimination of the disadvantages of the prior art techniques described above, and it is therefore an object of the present invention to offer a method and equipment capable of achieving simplicity and convenience in the methods of indicating and operating the overlapping displays of a plural number of items of graphic attribute information, thereby making the condition and state of the overlapping of such information easy to understand by intuition, so that the various items of graphic attribute information may be combined freely to set up various combinations of such information for display in a natural and favorable manner of operation.

The graphic image displaying system according to the present invention comprises a memory means which stores graphic data having a plural number of graphic layers composed of a plural number of graphic elements accorded respectively with attribute information; a displaying means which indicates the graphic data mentioned above; a selecting means which is operated for selecting a graphic layer to be displayed by the displaying means mentioned above; a setting means which is provided for each graphic layer mentioned above and operated for setting up each graphic element on a graphic layer for display thereof by means of the displaying means mentioned above; and a display control means which reads a graphic layer selected by the above-mentioned selecting means out of the memory means mentioned above and puts the graphic layer thus read out on overlapping display on the display screen of the displaying means on the basis of the result of a setup by the setting means mentioned above.

The graphic information is composed of a plural number of graphic layers.

For example, map data will be composed of graphic layers each of which consists of each item of map information gathered for each attribute of a map. That is to say, data on necessary graphic layers determined with attention paid to the attributes of various types of maps, such as a land use area map, which shows various areas by the statutory land use areas, a street block map, which shows the blocks on the streets, and a building map, which represents the buildings in a given area, are respectively prepared in advance and stored in the memory means.

Moreover, each graphic layer is accorded with attribute information for each of the graphic elements forming a graphic image. For example, in case a graphic layer is that of a building map, the data on each building (namely, a graphic element) are accorded with attribute information on such items regarding the building as the height of the building, its use, and its construction.

A desired graphic layer can be selected by the selecting means, overlapped by the display control means, and then put on display, as thus overlapped, by the displaying means.

Additionally, it is possible to set up the display attributes by the setting means at the time of the display of each graphic layer. For the setup of display attributes, the steps include the selection of a graphic element to be put on display and the setup of the mode of display. For example, a graphic layer expressing the construction of a building can be set up to display an attribute of a building, such as a wooden building, a concrete building, and a ferro-concrete building, as selected appropriately, and it is also possible to set up a mode of display (for example, the color for display and the pattern for display) for each of these attributes.

The display control means controls the displaying steps in such a manner that a graphic layer selected by the selecting means is read out of the memory means and that the graphic layer thus read out is put on display in overlapping on the display screen of the displaying means on the basis of the result of the setup effected by the setting means.

The present invention composes graphic data with a plural number of graphic layers assembled by each attribute of a graphic image and enables the user to select any desired graphic layer with the selecting means and to put the selected graphic layers in overlapping with each other, provided that they are in any plural number, so that the user will be able to display a graphic image with the same operating feel as that for displaying overhead projector (OHP) sheets in overlapping with each other by means of an overhead projector (OHP) and further to select any attribute within each graphic layer and to set up a mode of display for the graphic layer. In this manner, the user will also be able to gain an easy intuitive understanding of the operations for the display of graphic images without experiencing any complication in the procedure for obtaining displayed information from one sheet of graphic data, as in the case of a conventional graphic image (map) data display system, or any difficulty in gaining an intuitive understanding of the manner how to operate the system because the attributes to be selected are arranged in a hierarchical structure as described above.

Furthermore, the present invention in the construction described above is provided with a memory means for storing, for use at a later time, information on the result of a setup of a display attribute with the setting means.

For example, the graphic image displaying method for operation in a window system maintains information concerning the display attributes in icons corresponding to the graphic layers, and the setting means is to be used for setting up the information concerning the display attributes. Such a system is capable of maintaining a setup state by copying and storing such icons by the proper functions of the window system and using any such icons on the occasion when a corresponding graphic layer is to be put on display. Accordingly, the system can resume the setup prior to a change thereof only by an operation of an icon even after a change has been made, provided that the icon is copied and stored before a change is made of the setup of any display attribute in respect of a given graphic layer. Also, icons can be prepared in advance by setting up display attributes on them in correspondence with the respective displays of graphic image groups to be displayed for their frequent use, and the system will enable the user to put a graphic image on display on the basis of the display attribute as thus set up only by properly selecting the icon set up with desired display attributes and copying it to the graphic image display area, thereby achieving much improved operating efficiency. In addition, it is possible also to construct the system in such a manner as to be capable of copying the data of a corresponding graphic layer at the time of the copying of an icon (i.e. the copying of the display attributes), and such a system will then be capable of increasing the abundance of the graphic data and achieving a greater variety in the graphic images which it can display.

Further, according to one aspect of the present invention, the above-mentioned selecting means in the graphic image displaying system in the construction described above is provided with a user interface with which the user displays a graphic image display area and an icon corresponding to the graphic layer on the display screen of the display means mentioned above, indicates an icon corresponding to the desired graphic layer by means of a pointing device, and performs selecting operations by transferring the icon to the graphic image display area. With this user interface, the user will be able to perform a selection of graphic layers and to display the selected graphic layers in their overlapping only by operating the icon, thereby attaining far greater ease in the operation of the system as compared with the specification of attributes by the selection of buttons as in practice with the conventional system.

Also, according to another aspect of the present invention, the above-mentioned setting means in the graphic displaying system in the construction described above displays a display attribute setting window, which can be opened for each of the graphic layers mentioned above, on the display screen of the displaying means, the attribute setting window displaying the attribute information held by each of the graphic layers, and is also equipped with a user interface provided with buttons for selecting whether or not the graphic element having the attribute is to be put on display in the graphic image display area, so that the user may perform a display setting operation by indicating any desired button with a pointing device. Thus, this construction of the system enables the user to select a graphic element to be put on display for each graphic layer out of the graphic elements present within a graphic layer, and, as the user eventually selects attributes in two stages, which are a selection of a graphic layer and a setup of the display attributes within the graphic layer thus selected, and this construction of the system therefore offers ease for the user to gain an intuitive understanding of the hierarchical structure of the attributes and to perform the operations for selecting any desired graphic image.

Moreover, according to still another aspect of the present invention, the setting means mentioned above displays a display attribute setting window, which can be opened for each of the graphic layers mentioned above, on the display screen of the displaying means, the attribute setting window displaying the attribute information held by each of the graphic layers, and is also equipped with a user interface provided with buttons for setting up a mode of display for displaying a graphic element having the particular attribute, so that the user may perform a display setting operation by indicating any desired button with a pointing device. As regards the state of the display of the graphic element, the system in this construction is capable of enabling the user to set up a different color for each attribute. With this user interface, the user will be able to set up such a mode of display as the display of various attributes as differentiated with color.

According to still another aspect of the present invention, the display control means mentioned above comprises a software module constructed so as to control the above-mentioned graphic layers with layer objects expressed in an object-oriented language and layer icon objects as subclasses of the layer objects. Then, the layer objects mentioned above contain internal information for specifying the graphic layers while the layer icon objects have internal information for specifying the state and display attributes of the icons, and these objects furnish the above-mentioned internal information in response to a message from the display control means. Also, the display control means mentioned above includes a software module containing graphic image displaying objects expressed in an object-oriented language (namely, Atlas as described in an example of preferred embodiment given later), and the display control means draws a graphic layer in the graphic image display area with the software module in accordance with the internal information contained in the above-mentioned layer object and the above-mentioned layer icon object.

Thus, these aspects of the present invention produce icons of the objects and treat the objects explicitly as the objects of operation, and the system according to the present invention has a high degree of affinity with an object-oriented concept, which can be expressed by the formula, [object= data+procedure (behavior)], and is therefore capable of effectively constructing a user interface. In addition, the above-mentioned aspects of the present invention can overcome the disadvantage of the conventional system that all the conditions should be set up afresh in order to restore the display condition to its setup prior to a change thereof after a display condition has been changed. Yet, according to the above-mentioned aspects of the present invention, the system can save the icons for graphic information and can therefore resume the setup prior to a change, even after a change of the setup, only by an operation of an icon, provided that the icon is stored in advance before the setup of a display condition is changed.

The graphic image displaying method according to the present invention is comprised of the individual steps, which are: preparing graphic data composed of a plural number of graphic layers composed of a plural number of graphic elements accorded respectively with attribute information; controlling the above-mentioned graphic data for the individual graphic layers; selecting the graphic layers to be put on display by the above-mentioned displaying means; setting up the display attributes for the display of each graphic element in each of the above-mentioned graphic layers with the above-mentioned displaying means; and displaying the graphic layers selected as mentioned above in their overlapping on the display screen of the displaying means on the basis of the result of the above-mentioned setup. According to this method, the indicating and operating methods are simplified for greater convenience with respect to the overlapping display of a plural number of items of graphic attribute information, so that the user may gain an intuitive understanding of the condition and state of the overlapping display and that the user can therefore freely set up combinations of the items of graphic attribute information for their overlapping display and obtain a natural and favorable feel in the operation of the system.

BRIEF DESCRIPTION OF THE DRAWINGS

FIGS. 3a through 3h are charts illustrating the procedure for displaying the graphic information in a state of their overlapping, using a user interface according to the present invention, and these charts show the manner how the display on the screen of the graphic display unit changes along with the operating steps, and, of these drawings, FIG. 3a is a chart showing the initial screen in (1) in the chart and the screen for the selection of the icon A in (2) in the chart;

FIG. 3b is a chart illustrating the instructions given for a transfer of the icon A in (3) in the chart and the selection of a graphic image display area in (4) in the chart;

FIG. 3c is a chart illustrating a display of the graphic information A in (5) in the chart and the selection of the icon B in (6) in the chart;

FIG. 3d is a chart illustrating the instructions given for a transfer of the icon B in (7) in the chart and the selection of the graphic image display area in (8) in the chart;

FIG. 3e is a chart illustrating the overlapping display of the graphic information B and the graphic information A in (9) in the chart and the selection of the icon A in the graphic image display area in (10) in the chart;

FIG. 3f is a chart illustrating the start of the graphic information condition setting function as applied to the icon A in the graphic image display area in (11) in the chart and illustrating the condition setup a by the graphic information condition setting means in (12) in the chart;

FIG. 3g is a chart illustrating the condition setup b in (13) in the chart and the condition setup c in (14) in the same chart;

FIG. 3h is a chart illustrating the conditional graphic image drawing in (15) of the chart;

FIG. 11a is a chart illustrating the initial screen appearing when a map is put on display;

FIG. 11b is a chart illustrating the display screen in the state with a usewise area map drawn thereon;

FIG. 11c is a chart illustrating the display screen in the state with two graphic layers consisting of a usewise area map and a land use map being drawn thereon;

FIG. 11d is a chart illustrating the screen for the display condition setting interface;

FIG. 14 is a chart for illustration of a description of the objects for the icon displaying function and the graphic information display condition setting function;

FIG. 15a is the former half part of a chart illustrating a description of the objects for the icon or graphic display area selecting and operation instructing function;

FIG. 15b is the latter half part of a chart illustrating a description of the objects for the icon or graphic display area selecting and operation instructing function;

FIG. 16 is a chart for illustrating a description of the objects for the graphic information displaying function;

DETAILED DESCRIPTION OF THE PREFERRED EMBODIMENTS

Figure 2:
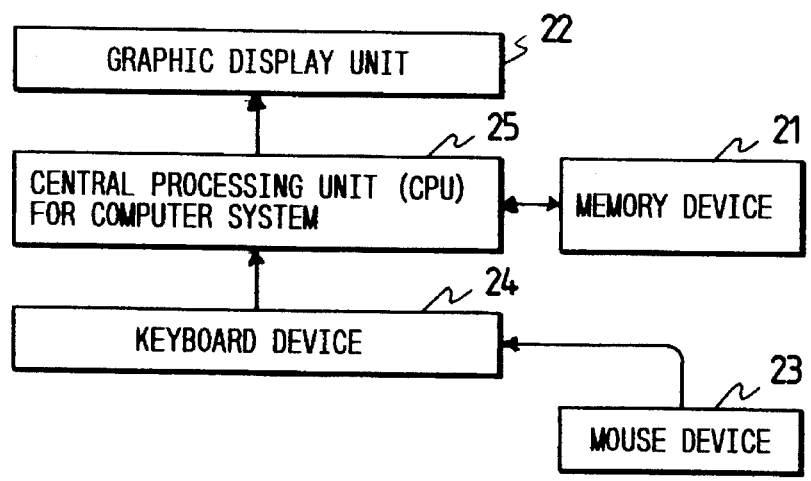
FIG. 2 is a chart illustrating an example of the hardware construction in embodiment of the present invention.

FIG. 2 shows an example of the hardware construction of an apparatus in embodiment of the present invention. The apparatus in this embodiment is comprised of a memory device 21 which stores programs and data for executing various functions offered by the present invention, as well as graphic information, a graphic display unit 22 which works as an interface, a mouse device 23 which is used as a pointing device, a keyboard device 24, and a Central Processing Unit (CPU) 25 for a computer, which carries out the functions described below by its execution of the programs mentioned above.

Figure 1:
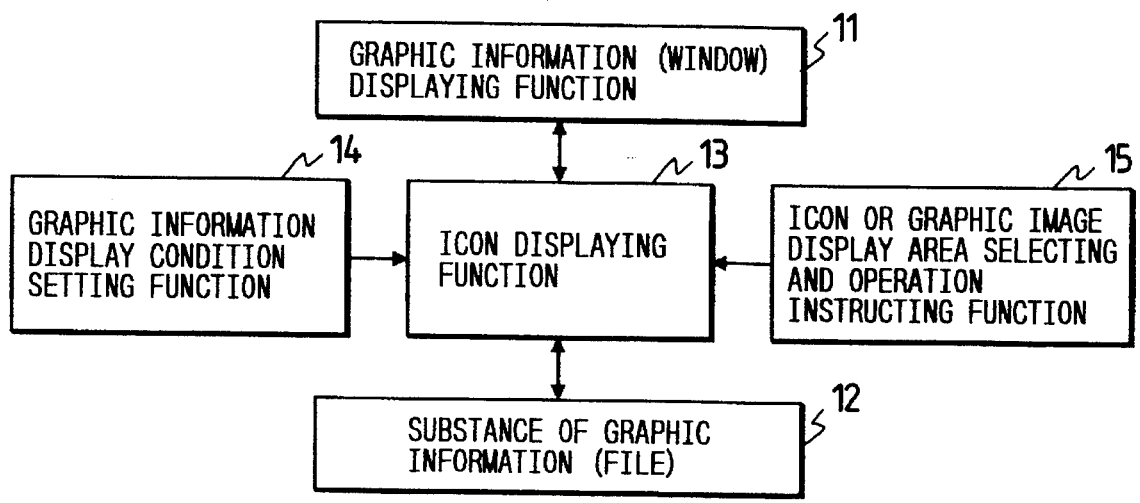
FIG. 1 is a functional block diagram illustrating one embodiment of the present invention.

The functions of the apparatus in this embodiment include a graphic information (window) displaying function 11, which displays graphic information like the information shown in FIG. 1 in an arbitrarily determined rectangular area (window) on a graphic display unit 22, the substance 12 of graphic information (files) resident in the memory device 21, an icon displaying function 13, which displays the substance in the form of an icon on the graphic display unit 22, a graphic information display condition setting function 14, which sets up a display condition for displaying the substance of the graphic information indicated by the icon on the graphic display unit 22 by the graphic information (window) displaying function 11, and an icon or graphic image display area selecting and operation instructing function 15, which performs a movement, a transfer, and a deletion of an icon put on display on the graphic display unit 22 by the icon displaying function 13 to an arbitrarily determined rectangular area or to any other position on the graphic display unit 22 by a mouse device 23 and a keyboard device 24 and also issues instructions for the start of operation of the graphic information display condition setting function 14.

Now, the procedure for achieving an overlapping display of two types of graphic information (namely, graphic information A and graphic information B), which are resident in the memory device 21, by using a user interface embodying the present invention will be described below with reference to the accompanying drawings, FIG. 3a through FIG. 3h. These drawings, FIG. 3a through FIG. 3h, show the flow of operating steps (i.e., the procedure) and the manner how the display on the screen of the graphic display unit will change along with the operating steps.

First, it is assumed here that the substance of the graphic information A and that of the graphic information B are put on display in the form of the icon A and the icon B in advance on the graphic display unit 22. Also it is assumed that a graphic image display area is set up by the effect of the graphic information (window) displaying function 11 in a certain rectangular area on the graphic display unit 22 (as shown in (1) in FIG. 3a.

Figure 3C:
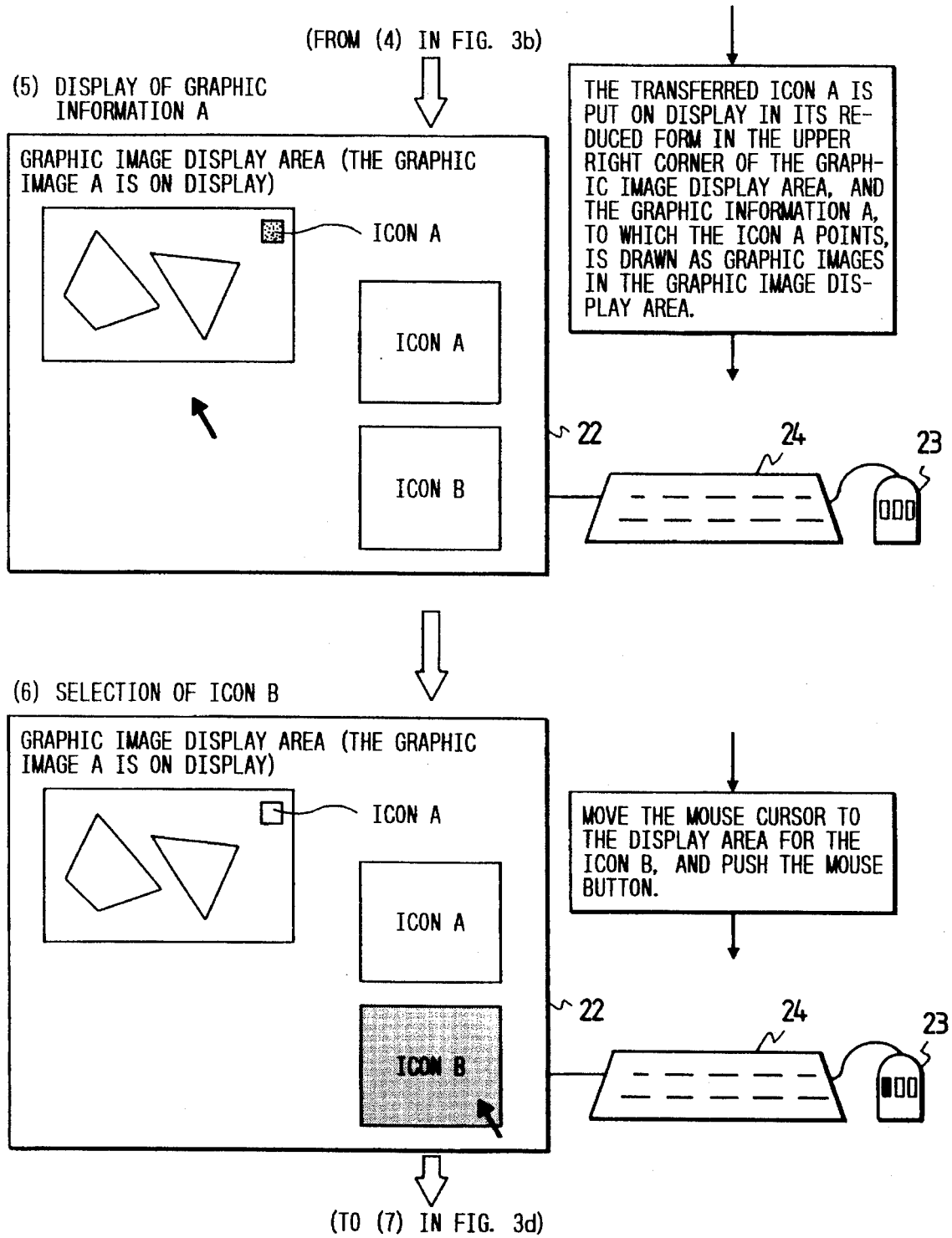
Figure 3H:
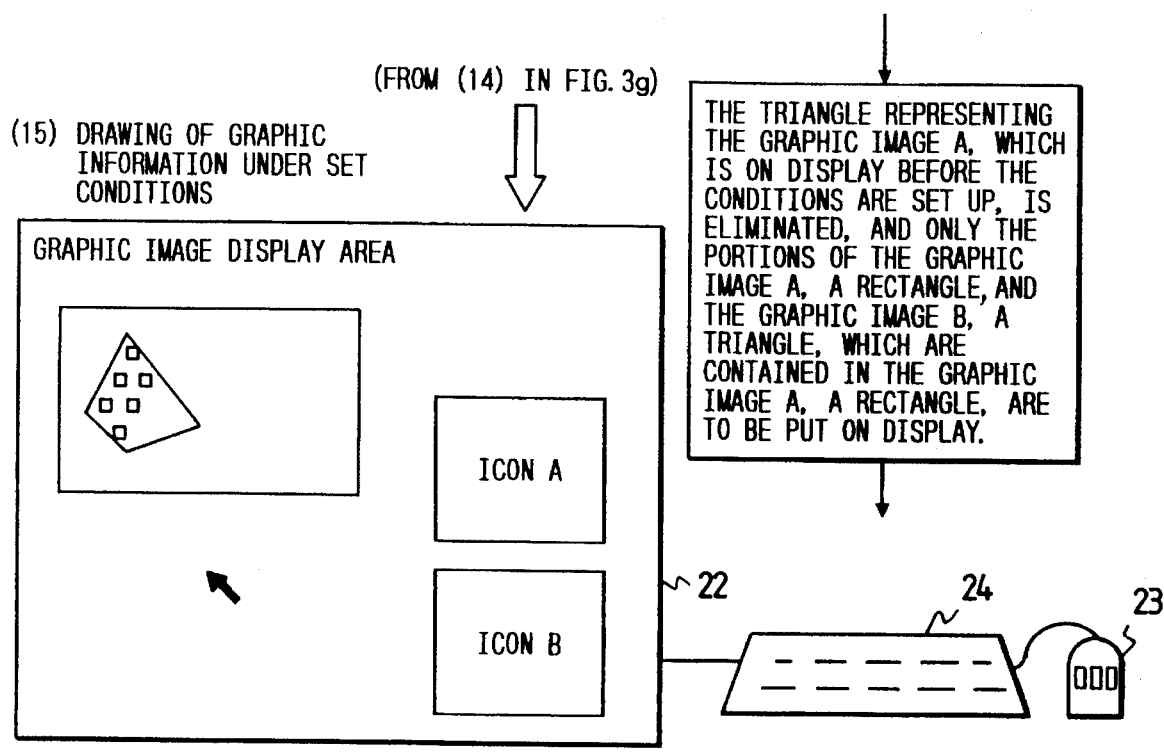
Figure 4:
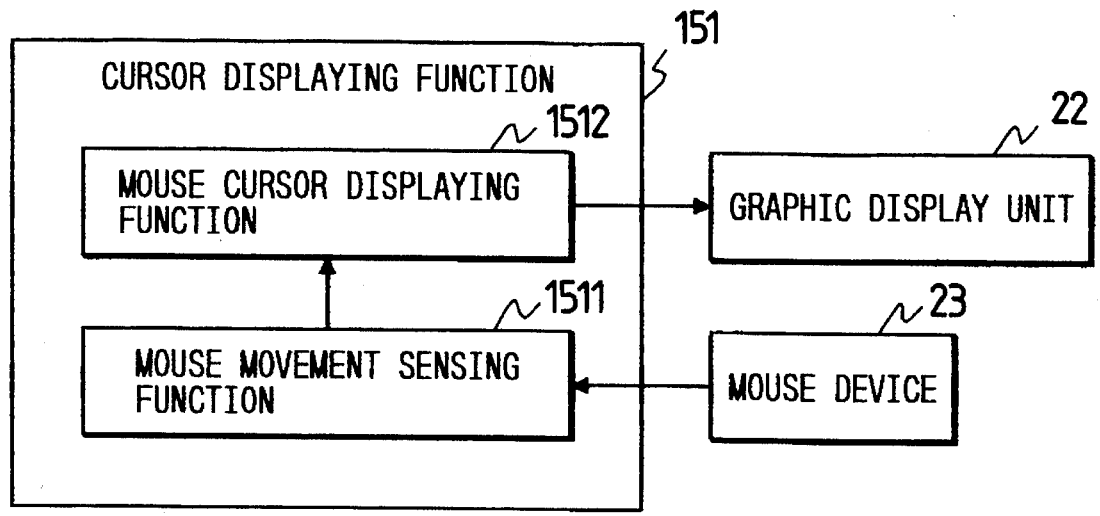
FIG. 4 is a chart illustrating the details of the cursor displaying function.
Figure 5:
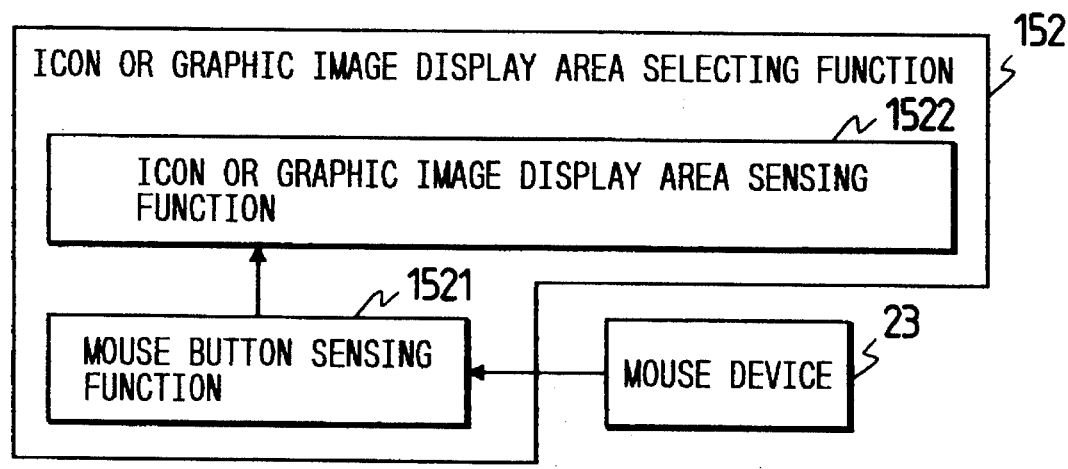
FIG. 5 is a chart illustrating the details of the icon or graphic image display area selecting function.
Figure 6:
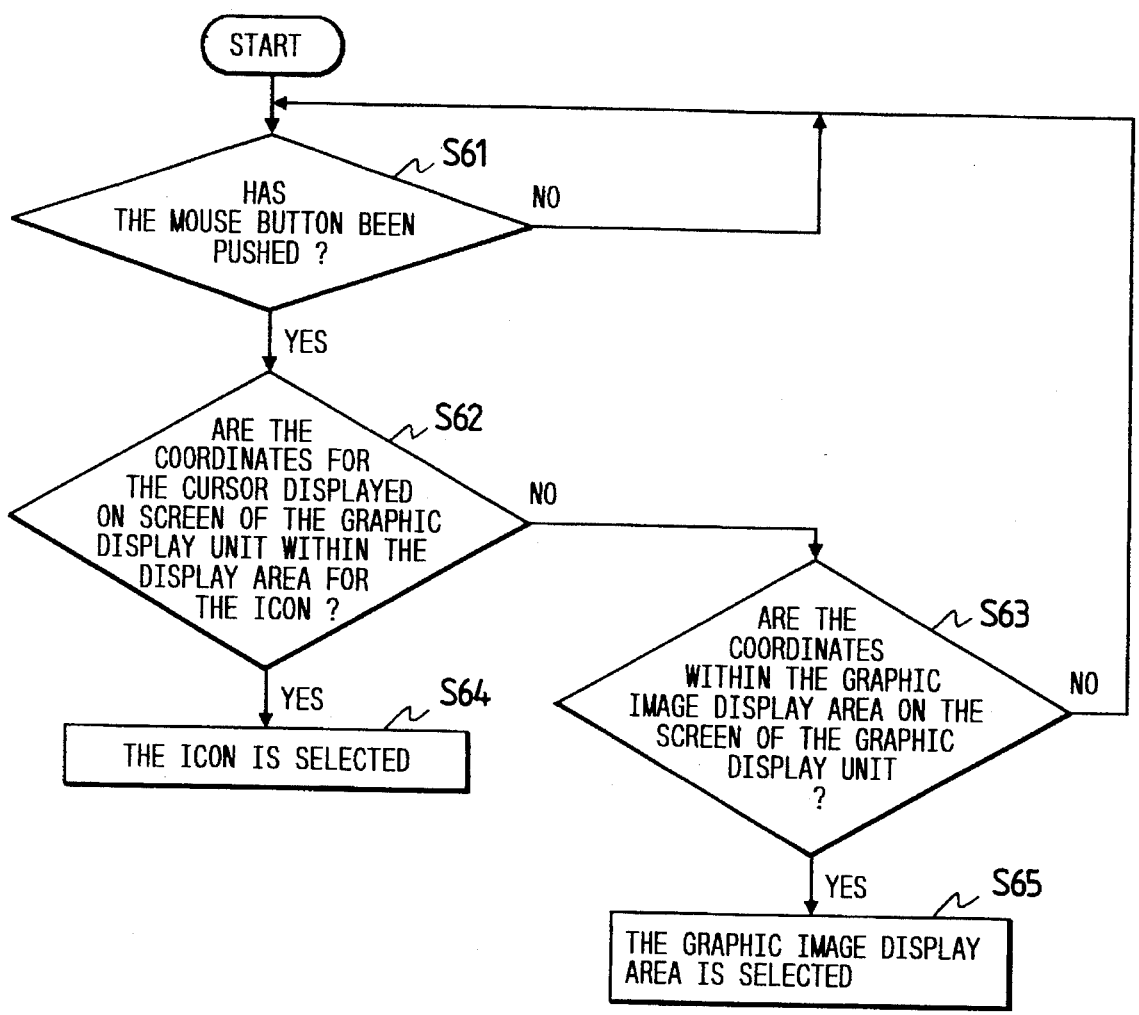
FIG. 6 is a chart illustrating the procedures for selecting an icon and for selecting a graphic image display area.
Figure 7:
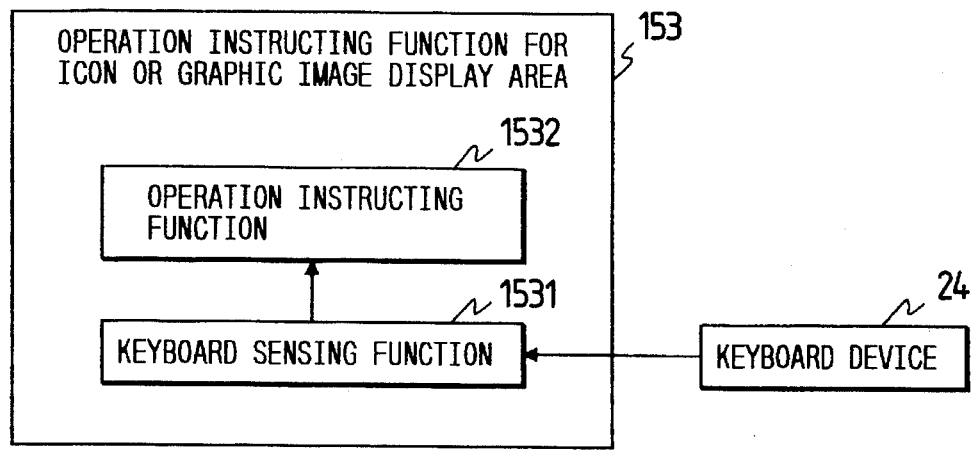
FIG. 7 is a chart illustrating the details of the operation instructing function for application to an icon or a graphic image display area.
Figure 8:
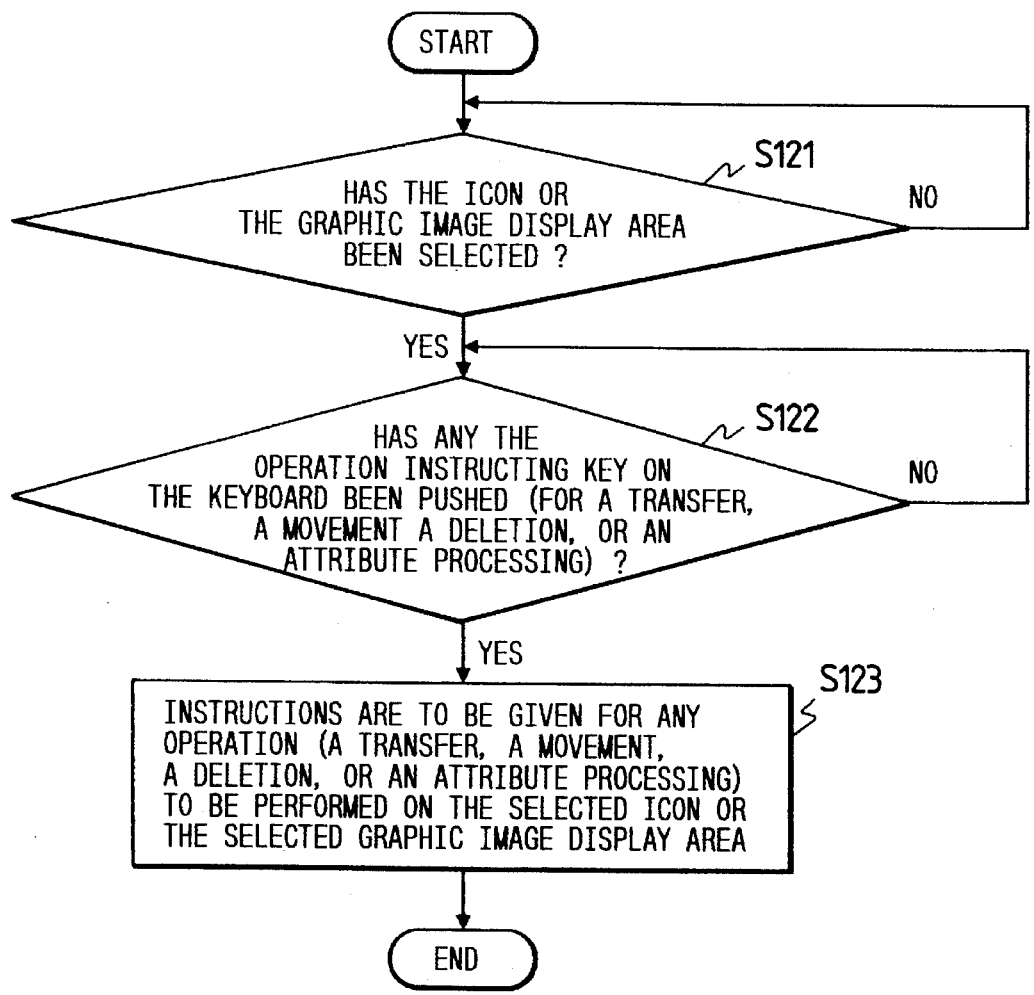
FIG. 8 is a chart illustrating the procedure for giving operation instructions to an icon or a graphic image display area.

Then, the icon A is selected (as shown in (2) in FIG. 3a) and a transferring operation is instructed (as shown in (3) in FIG. 3b) by operations on the mouse device and the keyboard device on the basis of the function block for the icon or graphic image display area selecting and operation instructing function 15 (as shown in FIG. 4, FIG. 5, and FIG. 7) and by the processing procedure (as shown in FIG. 6 and FIG. 8).

Now, a detailed description will be made further of this point. Specifically, the cursor displaying function 151 consists, as shown in FIG. 4, of a mouse sensing function 1511, which detects the movement of the mouse device 23 on the basis of an output signal from the mouse device 23, and a mouse cursor displaying function 1512, which generates a mouse cursor display control signal to the graphic display unit 22 on the basis of the detected movement of the mouse device 23 and causes the mouse cursor to be displayed on the graphic display unit 22. Moreover, the icon or graphic image display area selecting function 152 consists of a mouse button sensing function 1521, which detects the operation of any of the mouse buttons of the mouse device 23 when the button is pushed, as shown in FIG. 5, and an icon or graphic image display area sensing function 1522, which determines whether the position of the cursor is located, when the mouse button is pushed, in the icon display area or in the graphic image display area.

Then, as shown in the processing procedure in FIG. 6, the mouse movement sensing function 1511 and the mouse button sensing function 1521 monitor a signal generated from the mouse device 23 (at the step S61), determining by the icon or graphic image display area sensing function 1522 whether the coordinates for the cursor put on display on the graphic display unit are located within the icon display area or not (at the step S62) when the mouse button is pushed and putting the corresponding icon into its selected state when the coordinates of the cursor are within the icon display area.

In case the coordinates of the cursor are found not to be located within the icon display area as the result of the determining operation performed at the step S62, the icon or graphic image display area sensing function 1522 is performed to determine (at the step S63) whether or not the coordinates for the cursor position are within the graphic image display area on the graphic display unit. When the result of this determining operation reveals that the coordinates of the cursor position are within the graphic image display area, the corresponding graphic image display area is put into its selected state (at the step S65). In case the position of the mouse cursor is not within the graphic image display area, the system will return to the step S61 and monitors the next event coming from the mouse device.

The icon or graphic image display area selecting and operation instructing function 153 consists, as shown in FIG. 7, of a keyboard sensing function 1531, which detects an output signal from the keyboard device 24, and an operation instructing function 1532, which detects which of the keys on the keyboard has been pushed and issues instructions for an operation on the basis of the result thus detected. FIG. 8 shows the processing steps to be taken by the icon or graphic image display area selecting and operation instructing function 153. This function monitors the state of selection of an icon or a graphic image display area (at the step S81) and, in case an icon or a graphic image display area is found to be selected, then this function checks (at the step S82) whether any of the operation instructing keys, namely any of the keys for transfer, movement, deletion, attributes, and so forth is pushed or not. If any of the operation instructing keys has been pushed, this function gives instructions for an operation to the icon or the graphic image display area thus selected.

In the same way, a graphic image display area is selected (as shown in (4) in FIG. 3b) as the destination for the transfer of the icon A by the use of the icon or graphic image display area selecting and operation instructing function 153. Specifically, the movement of the mouse cursor will puts the transferred icon A into its interlocking movement with the cursor movement. The mouse cursor (namely, the icon A) will be moved to the graphic image display area, and then the mouse button 231 is to be pushed.

Figure 9:
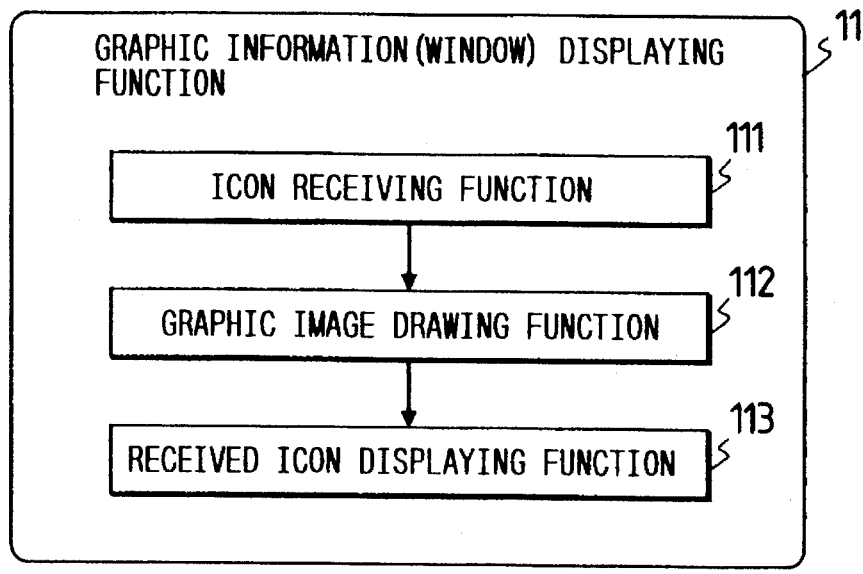
FIG. 9 is a block diagram illustrating the details of the graphic information displaying function.
Figure 10:
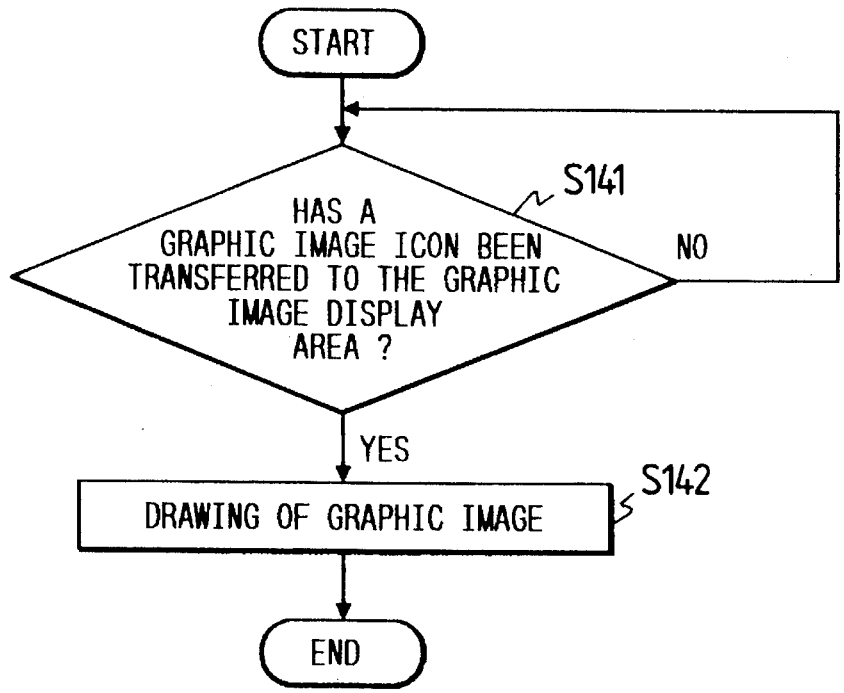
FIG. 10 is a chart illustrating the procedure for displaying the graphic information.

The graphic image A is drawn in the graphic image display area (as shown in (5) in FIG. 3c) on the basis of the graphic information (window) displaying function 11 shown in FIG. 9 and by the processing procedure shown in FIG. 10. On the occasion of this operation, a reduced form of the icon A will be displayed in the upper right corner of the graphic image display area, so that the user may recognize that the graphic image A is being put on display. That is to say, the graphic information (window) displaying function 11 consists, as shown in FIG. 9, of an icon receiving function 111, which receives an icon moved into the graphic image display area by an operation for the transfer of an icon as described above, a picture image drawing function 112, which draws the graphic information corresponding to the received icon in the graphic image display area, and a received icon displaying function 113, which displays a reduced form of the received icon within the graphic image display area. Then, the processing procedure consists, as shown in FIG. 10, of the steps for determining whether the graphic icon has been transferred to the graphic image display area (the step S101), reading the substance of the graphic information (file) corresponding to the particular icon from the memory device 21 when the graphic icon has been transferred, and performing the graphic image drawing operation (the step S102).

The procedures described above with reference to (2) in FIG. 3a through (5) in FIG. 3c are followed also with respect to the icon B (as shown in (6) in FIG. 3c through (9) in FIG. 3e), and overlapping displays (OR displays) are thereby made of the graphic image A and the graphic image B.

Next, a description is made of the procedure for putting an AND display of the graphic image A and the graphic image B, which are already put on display, by the use of the graphic information display condition setting function 14. The reduced form of the icon A, which is displayed in the upper right corner of the graphic image display area is selected with the icon or graphic image display area selecting and operation instructing function 15, and the start of the graphic information display condition setting function 14 is thereby instructed (as shown in (10) in FIG. 3e through (11) in FIG. 3f). Specifically, the mouse button 231 (shown in (10) in FIG. 3e) is pushed, with the mouse cursor moved to the reduced form of the icon A, which is positioned in the upper right corner of the graphic image display area. Then, the attribute key (i.e. the attribute button) on the keyboard device is pushed (as shown in (11) in FIG. 3f).

With the attribute key thus pushed, an interface screen for performing a setup of the condition for the display of the icon A is put on display (as shown in (12) in FIG. 3f). On the display condition setting interface shown in (12) in FIG. 3f, the types of the graphic images to be displayed are given a setup condition for displaying both a rectangle and a triangle, the condition for not displaying any triangle is set here (as shown in (13) in FIG. 3g). That is to say, a check mark on the interface screen is removed by a click given it with the mouse button.

Thereafter, with a click given further to the part marked "finished," the display condition setting operation will be completed (as shown in (14) in FIG. 3g).

Then, the graphic image in the graphic image display area will be drawn afresh under the new condition. Here, the condition is set up for drawing only the rectangular portion of the graphic image A, and the triangle which is on display before the setup of the condition is eliminated, so that only the rectangle in the graphic image A and the portion of the graphic image B which is included in the rectangle of the graphic image A are put on display (as shown in (15) in FIG. 3h).

The operating steps described above constitute the procedure for displaying the AND condition for the graphic image A and the graphic image B.

The information on the display condition as set up on the interface screen mentioned above is stored as the internal information of an icon. Also, a function of the window system can copy an icon, which, in other words, means that the system is capable of producing from an icon another icon which has the same internal information as the original one. Therefore, the system according to the present invention is capable of returning to the setup in effect prior to a change only by an operation of an icon, even after a change has been made, by copying an icon and storing the copied icon before any change is made in the setup of the display attributes with respect to a given graphic layer. In addition, this system is capable of preparing an icon containing the display attributes set up in advance in correspondence with the display in respect of any display graphic image group which is expected to be used frequently and putting a label appropriate for it on each such icon or storing such an icon in a folder, so that such an icon may be distinguished properly, and this system enables the user to perform the operations for displaying a graphic image on the basis of the display attributes thus set up in advance merely by selecting an icon in which the desired display attributes are set and transferring the icon to the graphic image display area, thereby achieving an improved level of operating efficiency.

The description made above uses simplified graphic images, but a concrete application of the present invention to a particular computer-aided mapping system will be capable of displaying a picture image rendered in color like the one shown in FIG. 11 on the display screen.

This system features a modeling of an actually existing system for drawing picture patterns (or characters) as classified into genres in keeping with a certain category on transparent overhead projector (OHP) sheets (i.e., transparency sheets) and projecting such picture patterns (or characters) in a combination of such transparent sheets as arbitrarily set by the operator by means of an overhead projector, using a software provided with the various functions shown in FIG. 1 and executed with a hardware shown in FIG. 2. In other words, the "usewise area icons" and the "land use icons" which are used in this embodiment of the present invention correspond respectively to transparency sheets on which picture patterns (or characters) are drawn, and the "areas for display on a map" corresponds to an overhead projector which projects the combined picture patterns (or characters).

Figure 11A:
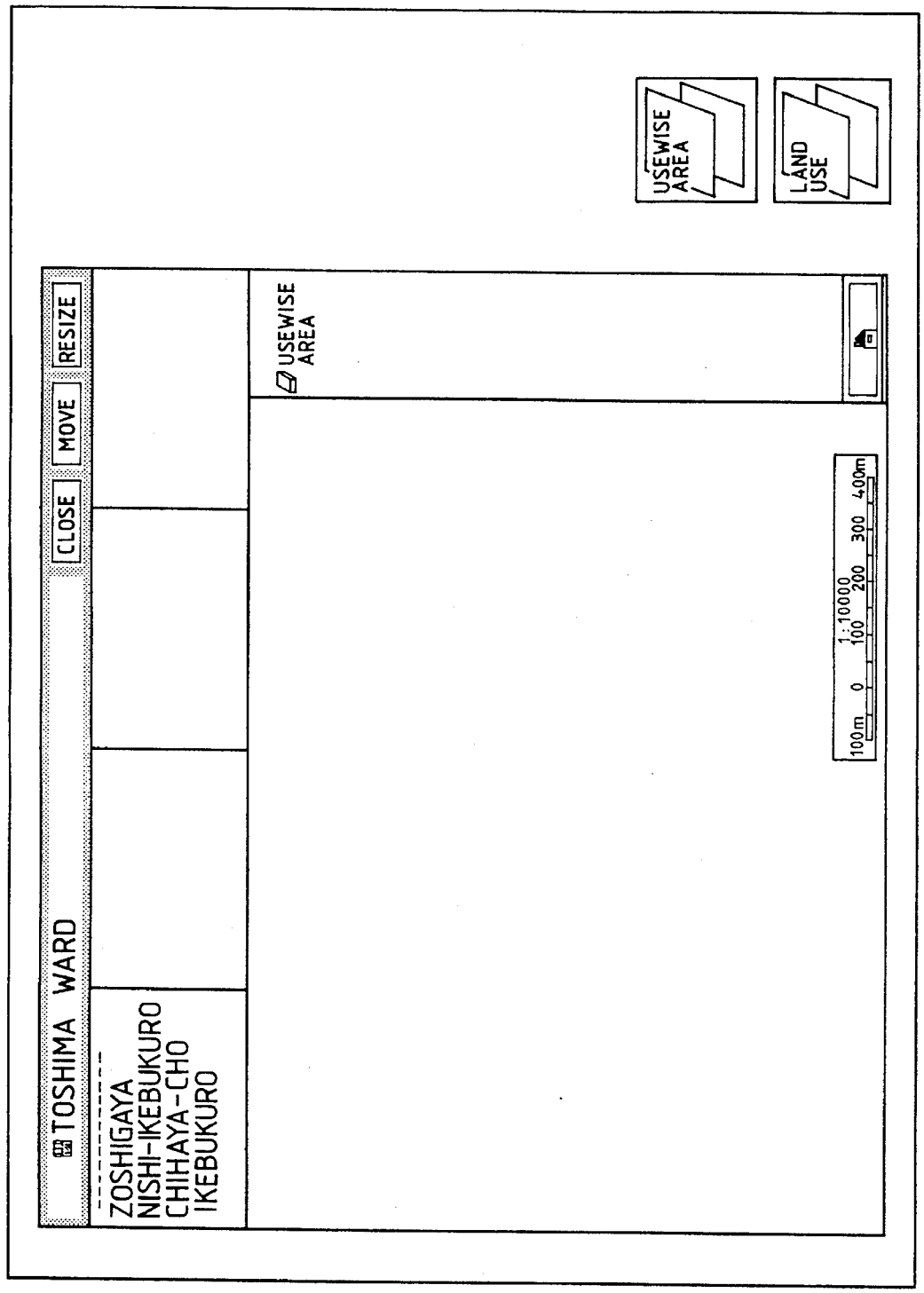
FIGS. 11a through 11d are charts illustrating actual examples of display screens with map information displayed thereon, and, of these charts.
Figure 11B:
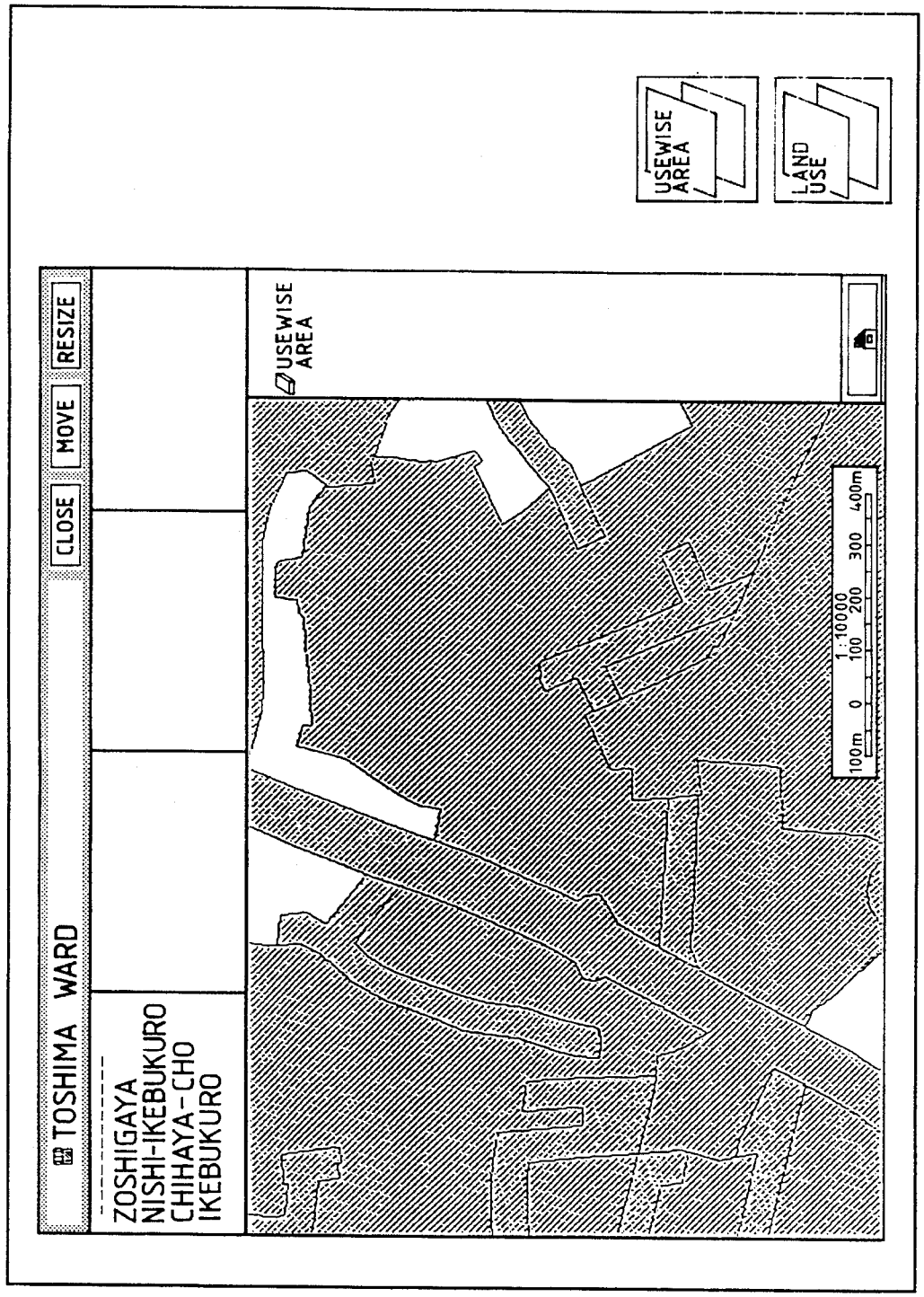
Figure 11C:
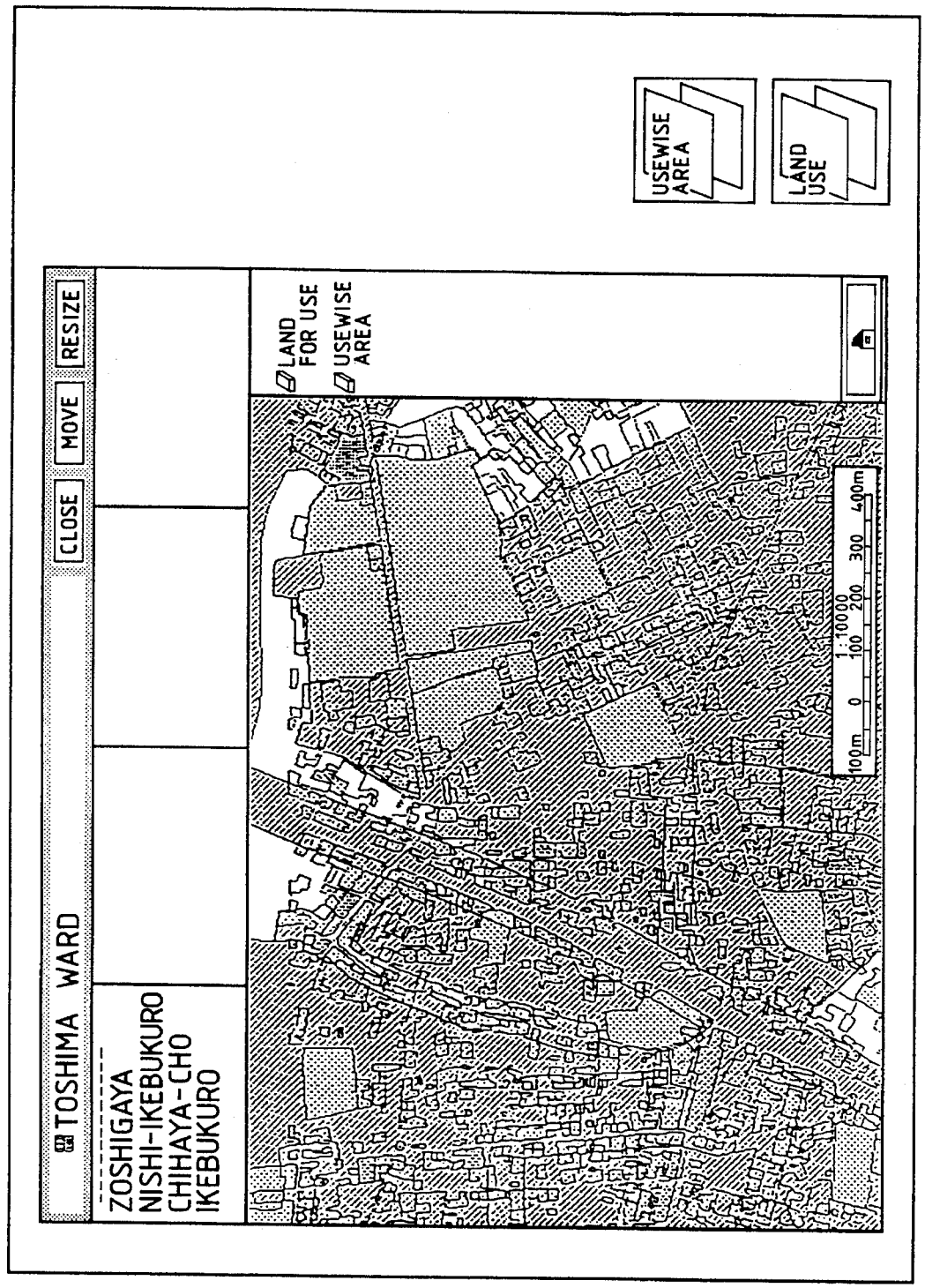
Figure 11D:
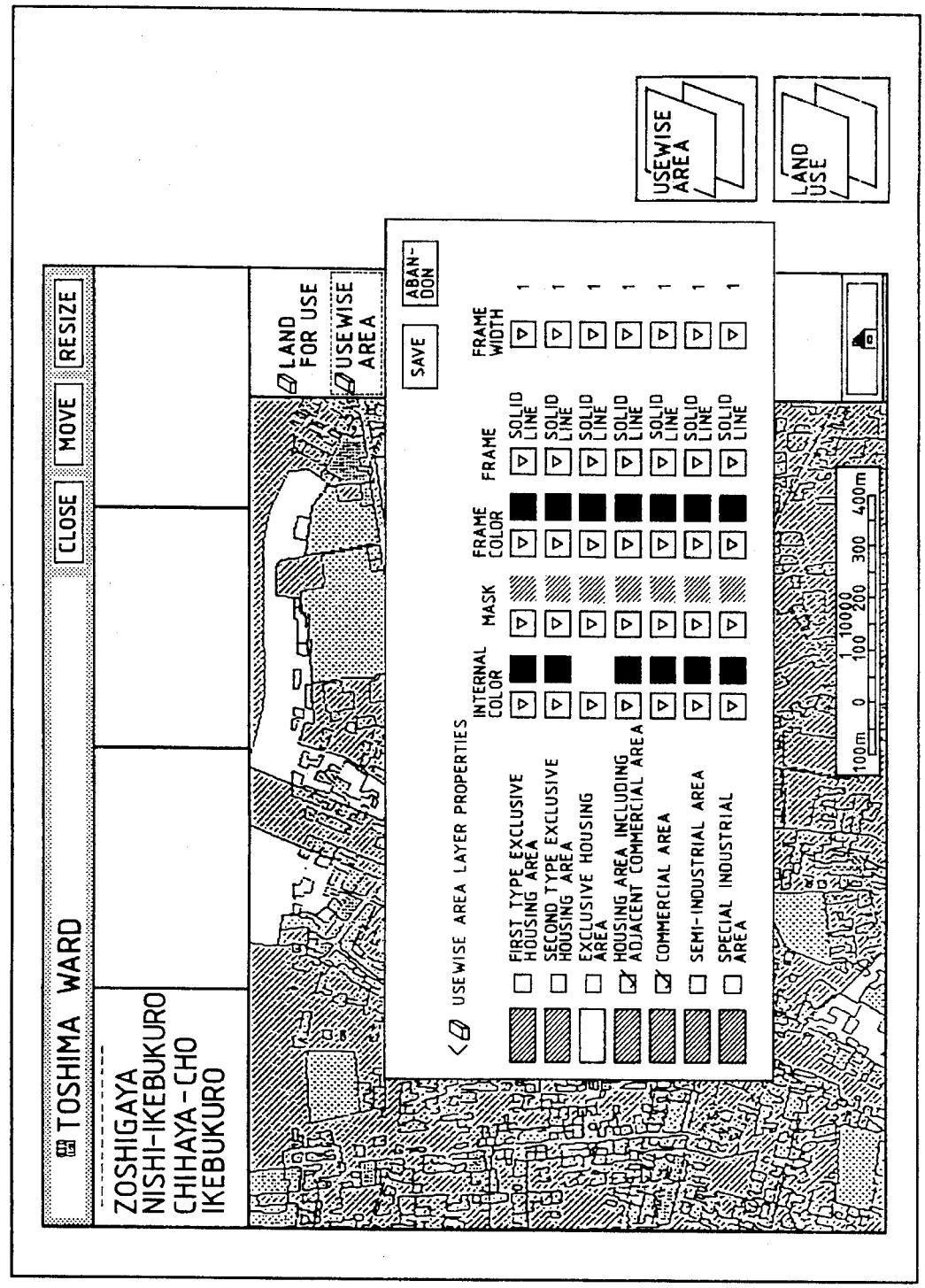

FIG. 11a shows the initial graphic image display screen, which shows a graphic image display area and two icons, namely, map icons respectively indicating the uses of the individual areas, such as a commercial area and an industrial area, and land use icons, which are map icons indicating the uses of land, such as stores, collective housing complexes, and government office buildings. The graphic image display area does not yet show any map on it. FIG. 11b shows the state in which a usewise area map is drawn on the graphic image display area. Moreover, the usewise area icons as reduced into reduced- icons are displayed in the upper right corner of the graphic image display area. This FIG. 11b is a monochromatic drawing and does not therefore show any quite distinct difference among the usewise areas, but the actual display on the screen is rendered in color differentiation to achieve a vivid differentiation of the various usewise areas. FIG. 11c shows the state in which a land use map is displayed in the graphic image display area together with a usewise area map. Also this map in FIG. 11c is in monochromatic rendition, which makes it more difficult to distinguish the various land use areas shown on the map, but the areas on the actual display of the map on the screen are differentiated in color, so that the representation of the different areas is distinct. FIG. 11d is a drawing which shows the interface screen for setting up the display condition. This interface screen is opened as a window by selecting a usewise area icon in the upper right corner of the display screen for the map and pushing an attribute key on the keyboard device. The usewise area map has a plural number of such categories of areas as exclusive housing areas, commercial areas, and industrial areas as those shown in FIG. 11d, and this interface screen enables the user to form a setup, by a click with the mouse device, to determine whether or not a given area is to be shown on the map. This system also enables the user to set up the display condition for determining the color and pattern in which a given area is to be displayed. Also in respect of a land use map, the system enables the user to set up a display condition in the same manner as described above.

Figure 11E:
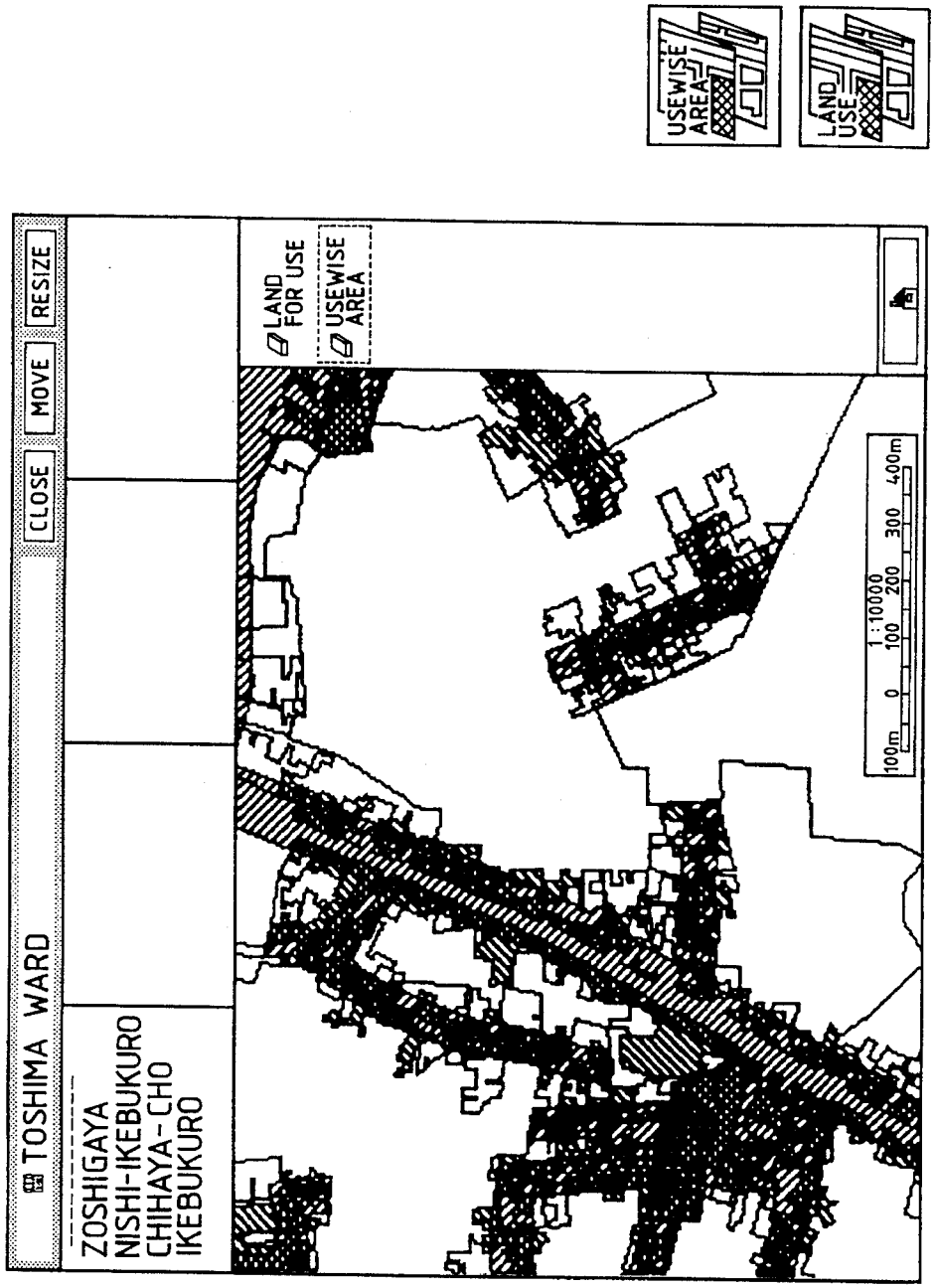
FIG. 11e is a chart illustrating the screen after completion of display condition setting.

FIG. 11e shows a display put on the screen after the completion of the setup of a display condition as described above, and the display shows the result of display in which only the "area including adjacent commercial areas" and the "commercial areas" are selected on the usewise area map and the result of display in which all the areas are selected on the land use area map. FIG. 11e shows that the display put on the screen after such a designation like this is made shows that the "area including adjacent commercial areas" and the "commercial areas" on the usewise area map, as well as the graphic patterns of the land use area map as included in these areas are put on display on the screen.

Figure 12:
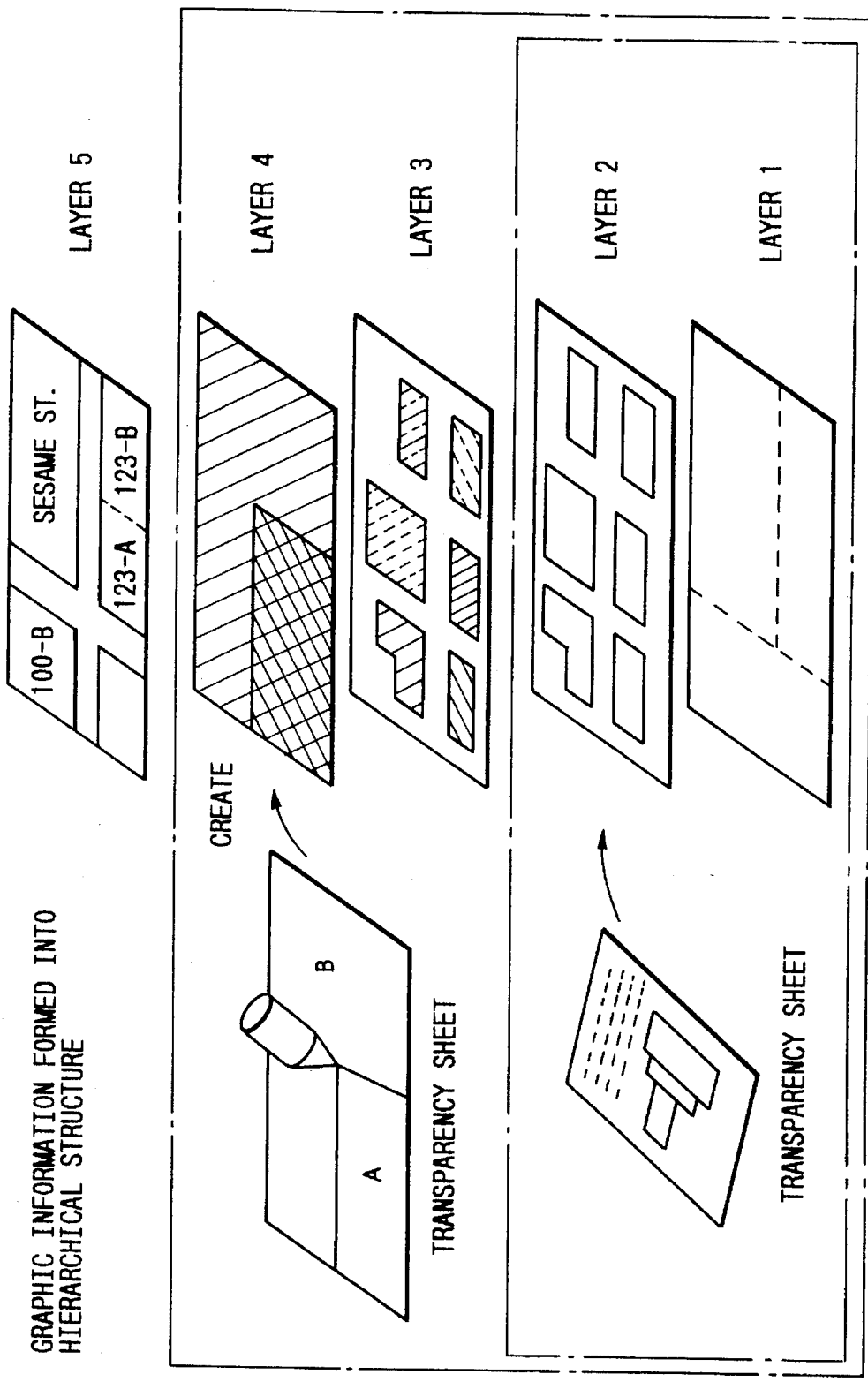
FIG. 12 is a chart illustrating graphic information formed into a hierarchical structure.

FIG. 12 shows an example of the relationship between transparency sheets and the graphic information formed in multiple layers (that is, in a hierarchical structure).

The mechanism for realizing each of the functions in the embodiment of the present invention is constructed almost entirely with a Smalltalk-80 system in an object-oriented language. All the items existing in the Smalltalk-80 system are defined as objects. Each object succeeds to the behavior of its upper-ranking class. That is to say, an object defined newly is formed so as to be in need of only the difference from the behavior possessed by the upper-ranking class. Therefore, the behavior of a given object represents not only the behavior of the object by itself but also the behavior of its upper-ranking class. Moreover, each function module is composed of the behavior of a plural number of objects.

Figure 13:
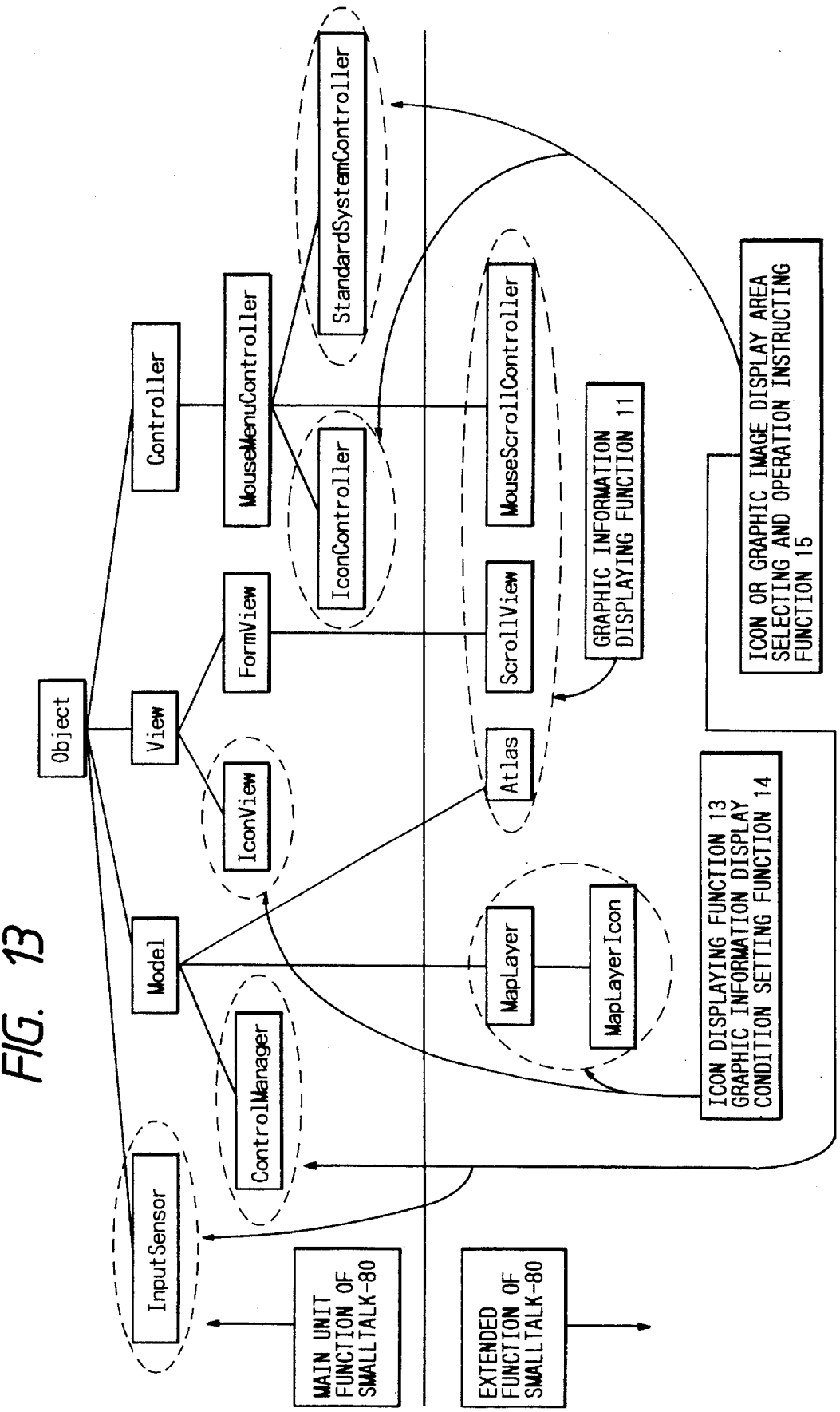
FIG. 13 is a chart illustrating an outline of the software construction in the system in the embodiment of the present invention.

The software construction formed by the Smalltalk-80 system for realization of the functions of each function module in this embodiment is shown in FIG. 13.

In the software construction shown in FIG. 13, the parts enclosed with the broken line are the elements of the Smalltalk-80 system. Of these parts, the individual classes, InputSensor, ControlManager, IconView, IconController, and StandardSystemController, which are written in the upper area above a horizontal straight line drawn in the central area, are the functions which are provided on the object-oriented language, Smalltalk-80 system, which is used for realization of the functions in this embodiment, and thus these functions are conventional ones. The individual classes, MapLayer, MaplayerIcon, Atlas, ScrollView, MouseScrollController, and so forth, which are written as extended functions of the Smalltalk-80 system in the lower area below a horizontal straight line mentioned above are the classes newly generated for realization of the functions in this embodiment. In this regard, a large number of introductions and manuals (for example, A. Goldberg and David Robson: "Smalltalk-80" (as translated into Japanese under supervision by Hideo Aiiso, Tokyo, Ohm Co., Ltd.) have already been published on the Smalltalk- 80 system, and the existing terms and their meanings are known as ordinary technical matters to the persons skilled in the art. For this reason, their detailed description is omitted here.

Yet, as the terms, class, "close," "instance," and "object" appear frequently in the present Specification, these terms will be briefly explained here. The definitions of these terms as quoted from the literature, "Smalltalk-80", cited above are as follows. Specifically, the term, "class," means a description of the method of executing a whole set of all the objects that express similar types of system constituent elements. The individual objects described by the class are called its "instances". The class describes the type of the memory for its exclusive use and the method of executing the operations for it. Now, let us take for an example a system object which describes the execution of an object expressing a rectangular area, and this class describes the method by which the individual instances memorize the locations of their respective areas and the method of executing the operations for the rectangular area. All the objects in the Smalltalk-80 system are instances of the class. Even those objects which express unique system constituent elements are definable as one instance of the class. Programming in the Smalltalk-80 system is comprised of the formation of classes, the formation of instances in each class, and definitions of the procedure and sequence for the exchanges of messages among the objects.

As shown in FIG. 13, the icon displaying function 13 and the graphic information display condition setting function are composed of the classes IconView, MapLayer, and MapLayerIcon. The icon or graphic image display area selecting and operation instructing function 15 is composed of the classes InputSensor, ControlManager, IconController, and StandardSystemController.

In the subsequent part, a description will be made of the mechanism and operation of each of the functional module.

a) Icon displaying function 13

In this embodiment, two types of graphic icons, namely, a graphic icon A (usewise area icon) and a graphic icon B (land use icon), are defined and used as objects indicating map information in a hierarchical structure. As is the case with the previous example, the icons correspond to transparency sheets, and the usewise areas and the land uses respectively mean picture patterns drawn on the transparency sheets. The icon displaying function for these icons are mainly composed of the three types of classes of MapLayer, MapLayerIcon, and IconView. The functions of these classes and their internal information or the like are shown in the form of a table in FIG. 14. The table shown in FIG. 14 consists of the items of Class Name, Class Layer, Function, Class Variable, and Instance Variable, and each of the variables consists of the items of Name and Meaning (Contents).

MapLayer is a class formed by modeling map information in a hierarchical structure, as shown in FIG. 14, and contains as its internal information the names and the collection of the types of graphic images to be drawn. With regard to the MapLayer, the item of Class Layer shown in FIG. 14 shows a hierarchical structure consisting of the class Object occupying the uppermost position, the class Model in the lower position, and the class MapLayer in the position below that of the Model. The class layers succeed to the functions of their upper-ranking class layers, as mentioned above. The class MapLayer has the function of map information formed into a hierarchical structure. Instance variables correspond to variables used in a program and express, by their values, the information concerning a map sheet having map information. The single map sheet, which has the information concerning the map, is given a name in the Japanese language (name) and a name in the Romanized alphabetic characters (eName) and also has information on the collection of the types of graphic images to be drawn, which will be information on the types of buildings, such as wooden structure, steel-reinforced concrete structure, and concrete structure, in case the map sheet is a map on which buildings are drawn, and additionally has information, such as the type of information to be displayed for expressing the types of the layers, such as information to be displayed with regard to buildings and information to be displayed with regard to land. In other words, the class MapLayer in the table in FIG. 14 indicates that this MapLayer is composed of five types of information on its own map.

MapLayerIcon has the function of an icon having map information formed into a hierarchical structure. This is the class which possesses the difference of the icon function, having the above-mentioned MapLayer as its super class. Then, this MapLayerIcon works with such input operations on the keyboard device as operations for a transfer, a movement, a deletion, and a property and additionally contains internal information on a picture of the icon itself and its label.

IconView is a subclass of View, and succeeds to internal information on such items as display coordinates and display area, which furnish material for a display on the screen, while the IconView itself has status information, as a difference of the internal information, such as the icon characters and the information whether the icon is to be displayed in reverse characters.

b) Graphic information display condition setting function 14

In the example given in FIG. 11d, a change is made of the setup of the condition for displaying the "usewise area icon". Here, a property sheet is used as an interface for specifying the type of graphic images to be drawn as selected out of the two types of graphic images, which are an "area including adjacent commercial area" and a "commercial area". As mentioned above, MapLayer has "areaClt" (shown in FIG. 15) as its internal information, which is an instance variable and is a collection of the types of graphic images to be drawn. The display condition is set up by giving a graphic image drawing ON-status to the particular objects coming under the "area including commercial areas" and the "commercial area" in the graphic image drawing type MapArea collected by this areaClt while giving a graphic image drawing OFF-status to any other graphic image drawing type MapArea, with a property sheet used as an interface in each case. The property sheet will be put on display by the operation of an attribute key on the keyboard device for the MapLayerIcon which has been selected.

Figure 20:
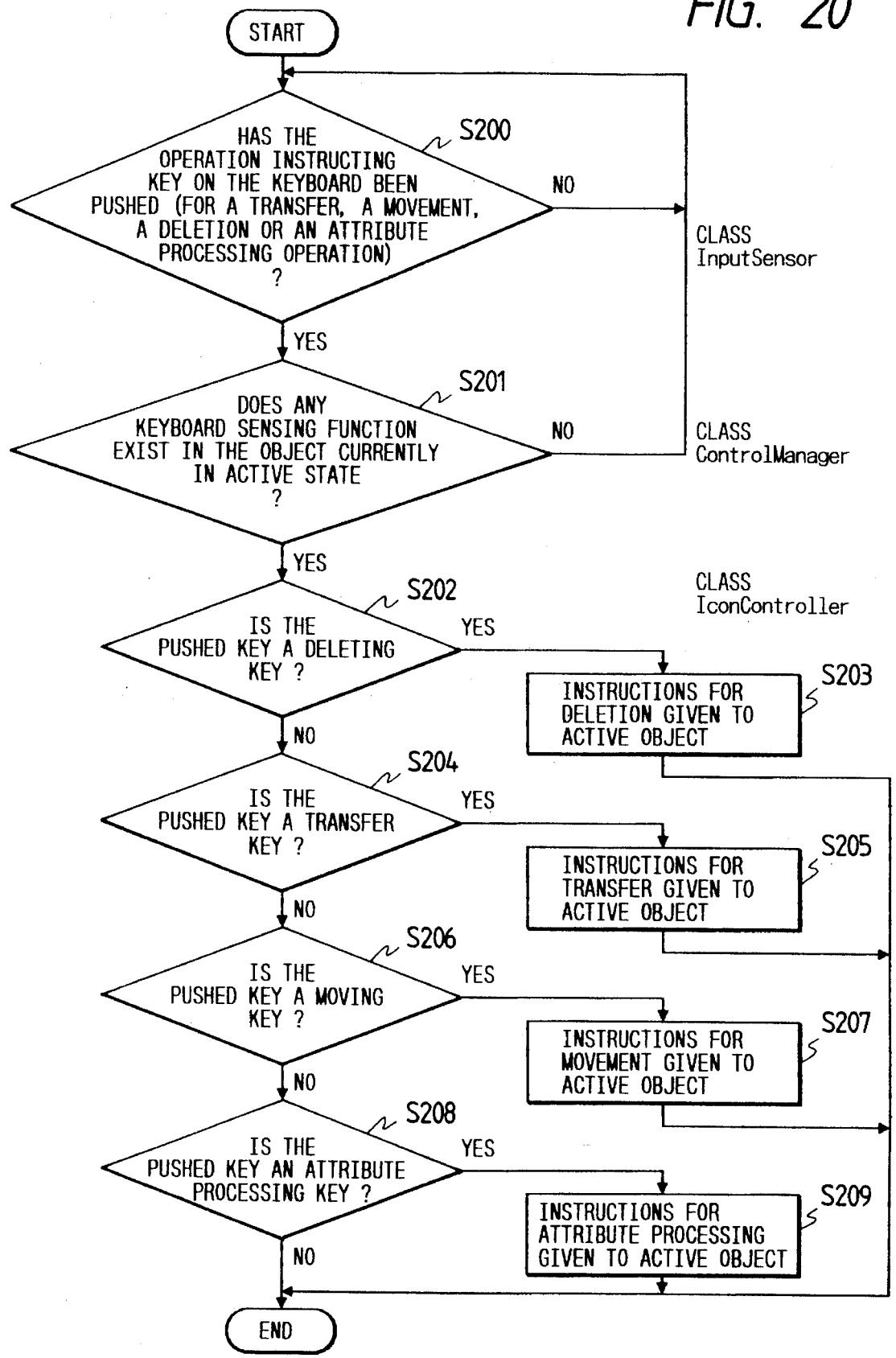
FIG. 20 is a flow chart illustrating the operations to be performed for realization of the operation instructing function.

A flow chart for instructions for operations, including the instructions for the displaying operation for a property sheet, is shown in FIG. 20. This property sheet displaying function is present in the MapLayerIcon itself.

In this operation flow chart, a function of the class InputSensor monitors whether or not the operation instructing key on the key board has been pushed (the step S200), and this function will continue its monitoring operation if the key has not yet been pushed, but, if the key has been pushed, the function of the class ControlManager will determine whether or not the object currently in its active state has any keyboard sensing function (the step S201).

In case it is found as the result of the determining operation that the object currently in its active state does not have any keyboard sensing function, the operation of the system will return to the step S200, but, in case the object has a keyboard sensing function, the system determines whether or not the pushed key on the keyboard is a deleting key (the step S202), and, if the key is a deleting key, the system will give the active object instructions for a deletion (the step S203).

If the pushed key is not any deleting key, the system will determine whether or not the pushed key on the keyboard is a transferring key (the step S204), and, if it is found that the pushed key is a transferring key, the system issues transferring instructions to the active object (the step S205).

However, if it is found that the pushed key is not any transferring key, the system will then determine whether or not the pushed key is a moving key (the step S206), and, if it is found that the pushed key is a moving key, the system gives moving instructions to the active object (the step S207).

If the pushed key is not any moving key, then the system will determine whether or not the pushed key on the keyboard is any attribute key (the step S208), and, if it is found that the pushed key is an attribute key, the system gives the active object instructions for processing the attribute (the step S209). However, if it is found that the pushed key is not any attribute key, the system shuts down the operation.

c) icon or graphic image display area selecting and operation instructing function 15

In this embodiment, this function is used to realize the selection of a "usewise area icon" and "a land use icon" and the instructions for a transfer and the instructions for a property (setup).

Figure 17:
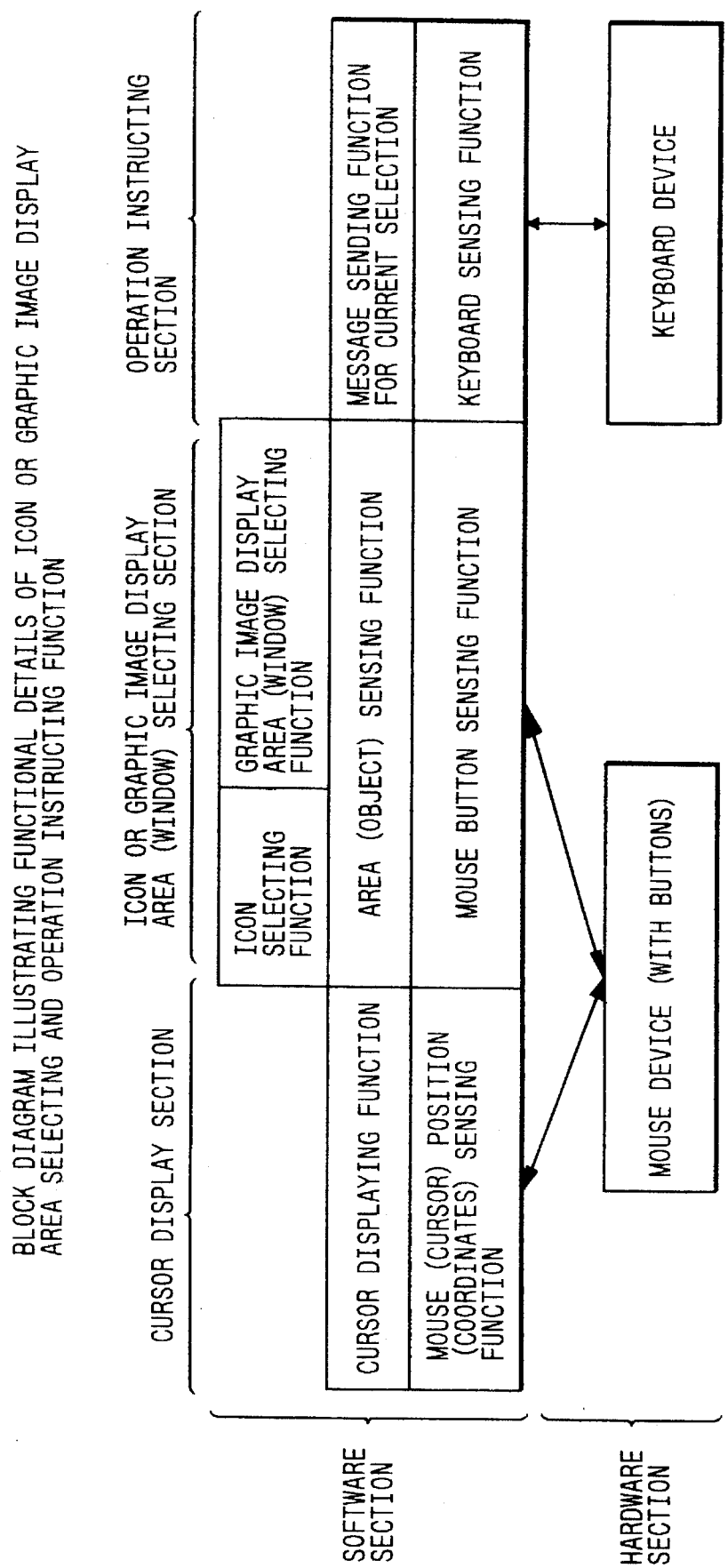
FIG. 17 is a functional block diagram illustrating the details of the icon or graphic image display area selecting and operation instructing function.
Figure 18:
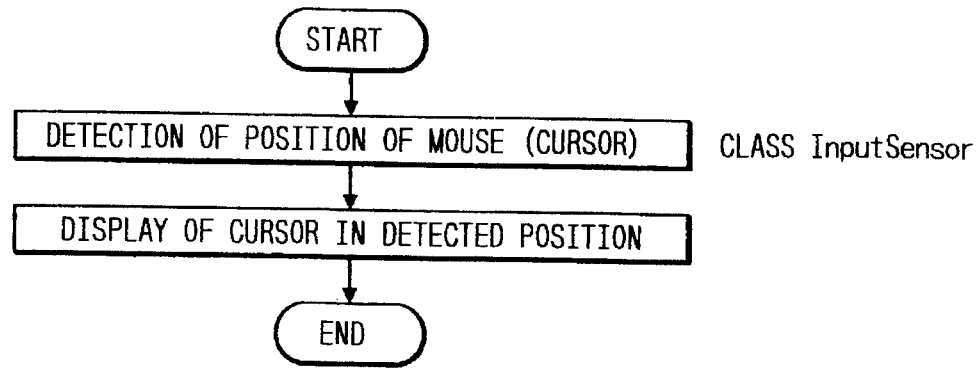
FIG. 18 is a flow chart illustrating the operations to be performed for realization of the cursor displaying function.
Figure 19:
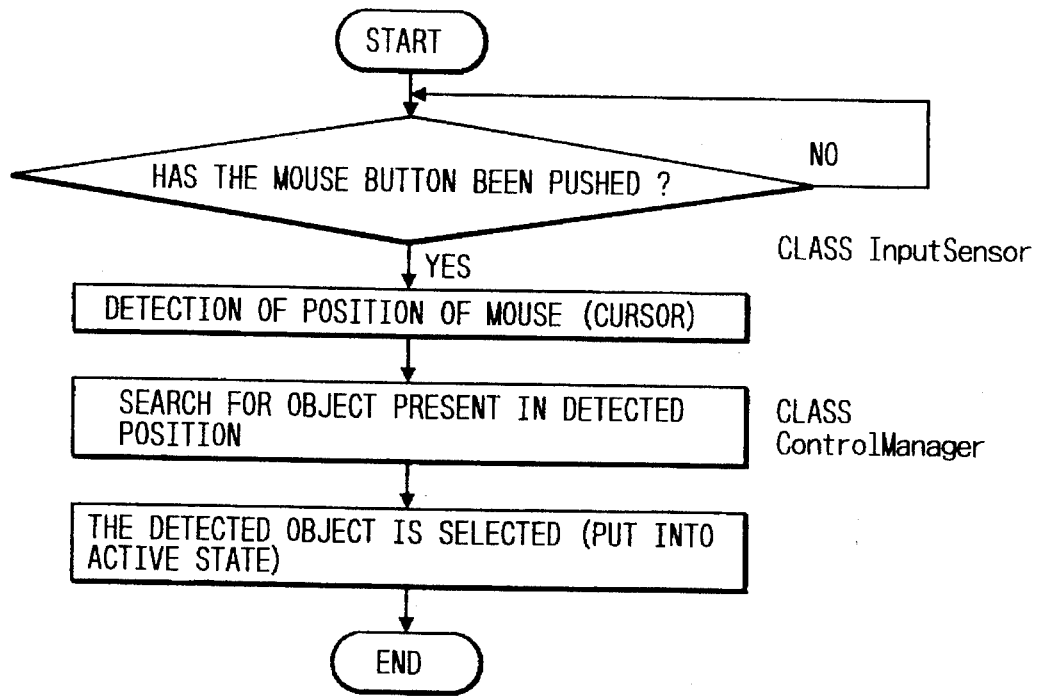
FIG. 19 is a flow chart illustrating the operations to be performed for realization of the icon or graphic image display area selecting function.

FIG. 17 is a block diagram illustrating the details of this function. This function is composed of a hardware section and a software section, and the hardware section is comprised of a mouse device and a keyboard device while the software section is comprised of a cursor displaying section and an icon or graphic image or graphic image display area selecting section, and an operation instructing section. The cursor displaying section is provided with a function for detecting the position of the cursor on the basis of a signal from a mouse device and a function for displaying the cursor in the position where it is thus detected. The icon or graphic image or graphic image display area selecting section is provided with a mouse button sensing function for sensing whether a mouse button is pushed, a region detecting function for detecting whether the cursor is positioned on the object, an icon selecting function for selecting an icon, and a graphic image display area selecting function.

The operation instructing section is provided with a keyboard sensing function, by which the system detects which of the operating keys on the keyboard device has been pushed and a function for sending a message to the object put into a selected state.

This function will be composed of the four classes of InputSensor, ControlManager, StandardSystemController, and IconController in case the Smalltalk-80 system is employed (see FIG. 15 and FIG. 13). The class InputSensor which has the class variable CurrentInputState for making access to the hardware as its internal information, senses the movement of the mouse device, the state of the mouse buttons, and the state of the keyboard. The state thus sensed of a device is handed over to the controller of an active View on which schedule control is being performed by the class ControlManager. The instructions for such operations as a transfer, a movement, a deletion, and a property (setup) to an icon on the keyboard are performed in the sequence as described above.

In case the controller for an active View is not found, the View into whose area the cursor enters first will be active. Also, in order to make the controller of another View active, the mouse button is to be operated, with the cursor moved to the inside of the View area. A selection of an icon is realized by this operation. The objects on which schedule control is performed by the ControlManager are the IconController and the StandardSystemController in this embodiment.

In this system, these Controllers are generated at the same time as the icons are formed, and these Controllers are put under the control of the Control manager at the same time. The selecting operation instructing demand which is sensed by the InputSensor is ultimately delivered to these Controllers, and their behavior is executed in accordance with the state of their respective models (MapLayer).

d) Graphic information (window) displaying function 11

In this embodiment, the "usewise area icon" and the "land use icon" are transferred to the graphic image display area, and the respective graphic images (namely, map) are thereby drawn in accordance with the set display condition. Also, the icons taken up as the objects of the graphic image drawing operations are displayed in their reduced form in the upper right corner of the graphic image display area at the same time as the graphic image drawing operation.

These functions are attained mainly by the three classes of Atlas, ScrollView, and MouseScrollController (refer to FIG. 13). The ScrollView, which is a lower-ranking class of the View, has the function of displaying a graphic image in accordance with the state of MapLayer which Atlas, which is a model, has as its internal information, as shown in FIG. 16. That is to say, the class ScrollView has a display area on the screen as its internal information.

Figure 21:
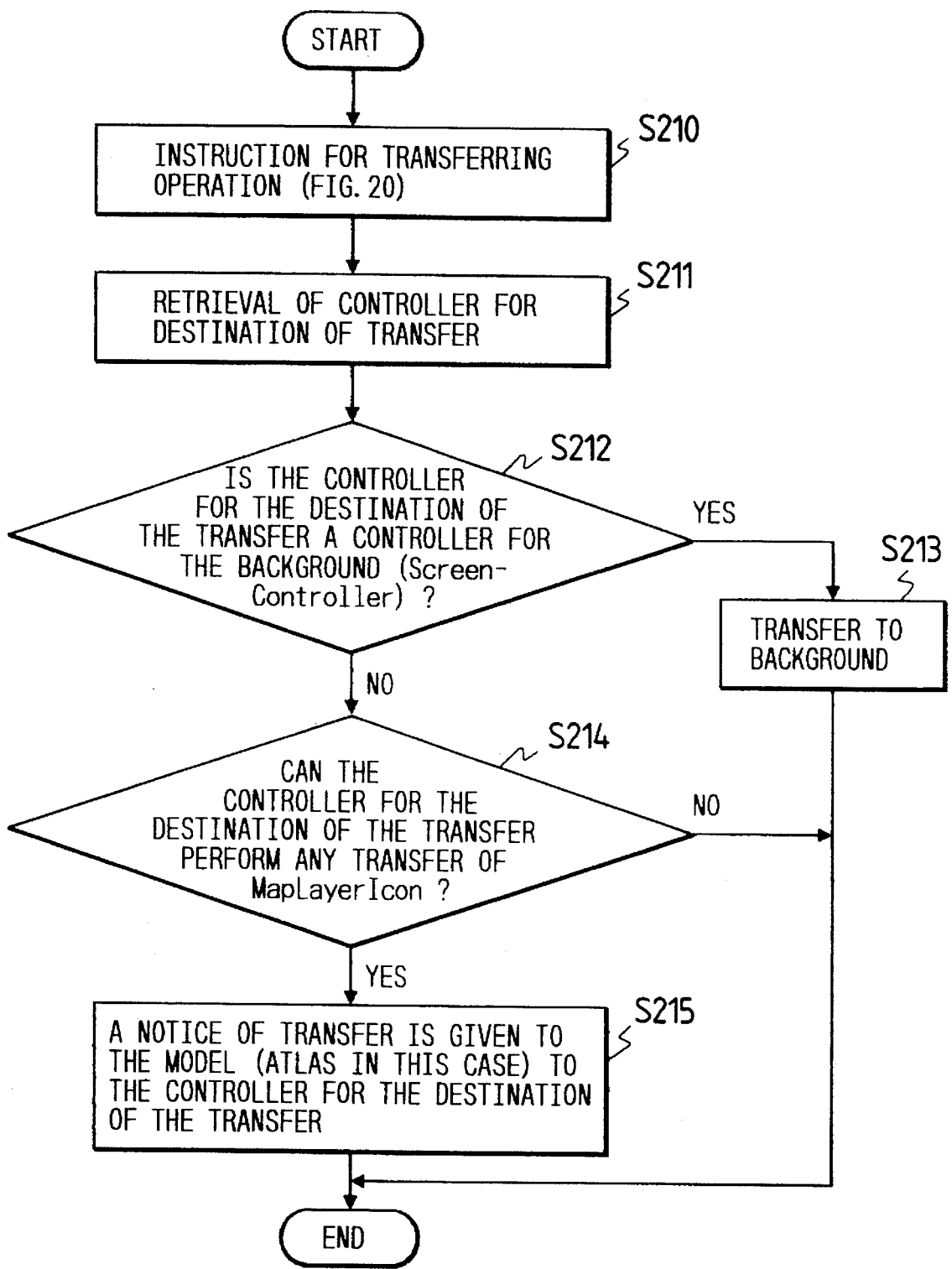
FIG. 21 is a flow chart illustrating the operations to be performed for realization of the graphic information displaying function.

FIG. 21 is a flow chart illustrating the operation performed by the graphic information displaying function 11 when instructions are issued for an operation for a transfer of an icon.

For example, instructions for a transfer are executed (at the step S211) in accordance with the flow shown in FIG. 20 when the "usewise area icon" and the "land use icon" receive instructions for transferring or moving operations.

The respective IconControllers for the MapLayerIcons "usewise area icon" and "land use icon" will search for the Controllers for the destination of their transfer or movement (at the step S211) on the basis of the position (namely, coordinates) of the mouse cursor at the time when the mouse button is pushed.

The IconController determines (at the step S212) whether or not the Controller for the destination of the transfer of the icons in the area as defined by the coordinates for which the mouse button has been pushed is a background controller (ScreenController), and, if the controller is a background controller, the IconController performs an operation for the transfer of the icons to the background (at the step S213).

In case the coordinates for which the mouse button has been pushed do not represent any background, but a graphic image display area (inside a ScrollView), the IconController finds the MouseScrollController as the controller for the destination of the transfer and, using this controller as the medium, notifies the Atlas, which is a model, that the icons have been transferred (or moved) (at the step S215).

Figure 22:
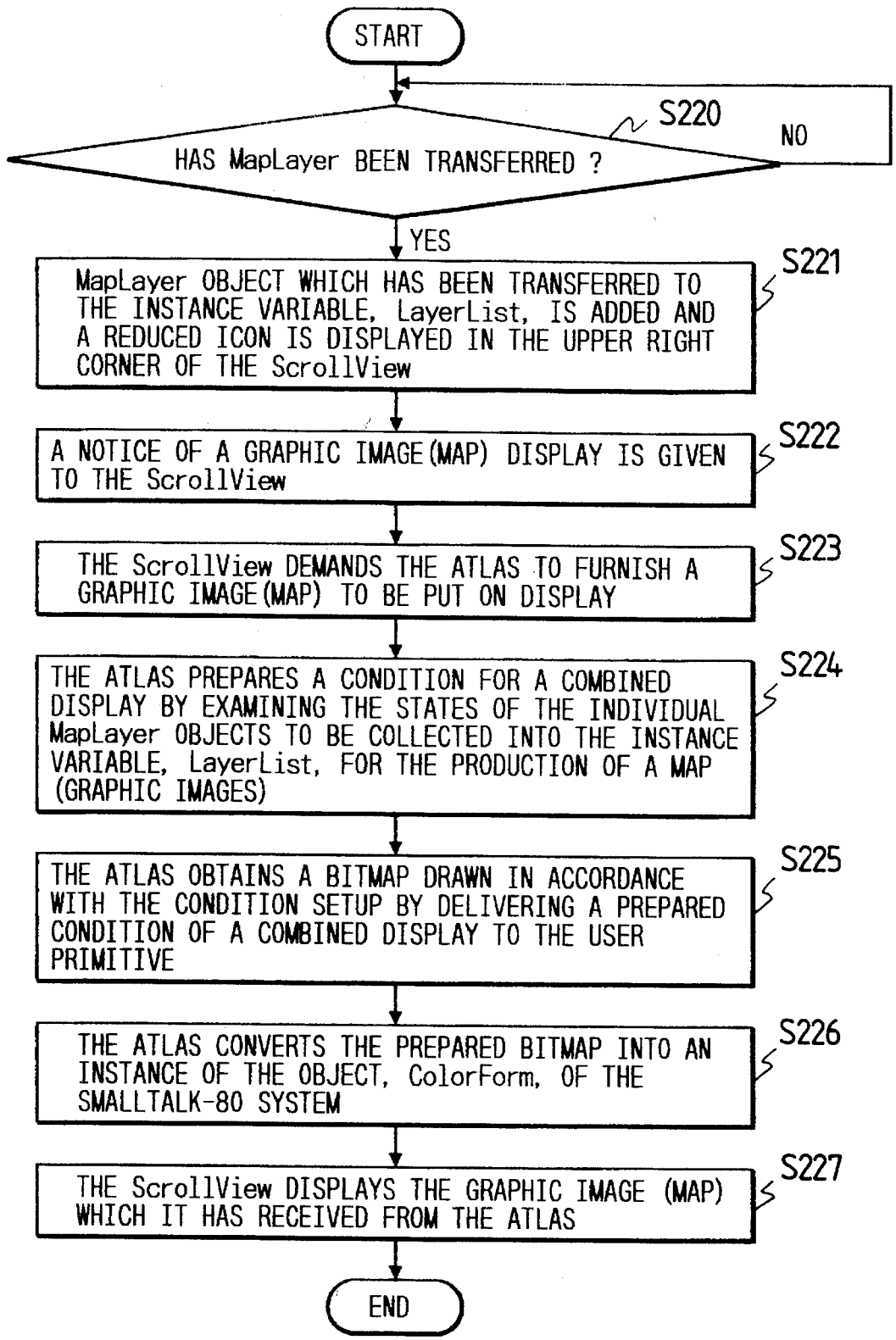
FIG. 22 is a flow chart illustrating the operations for drawing a graphic image map by the Atlas.
Figure 23:
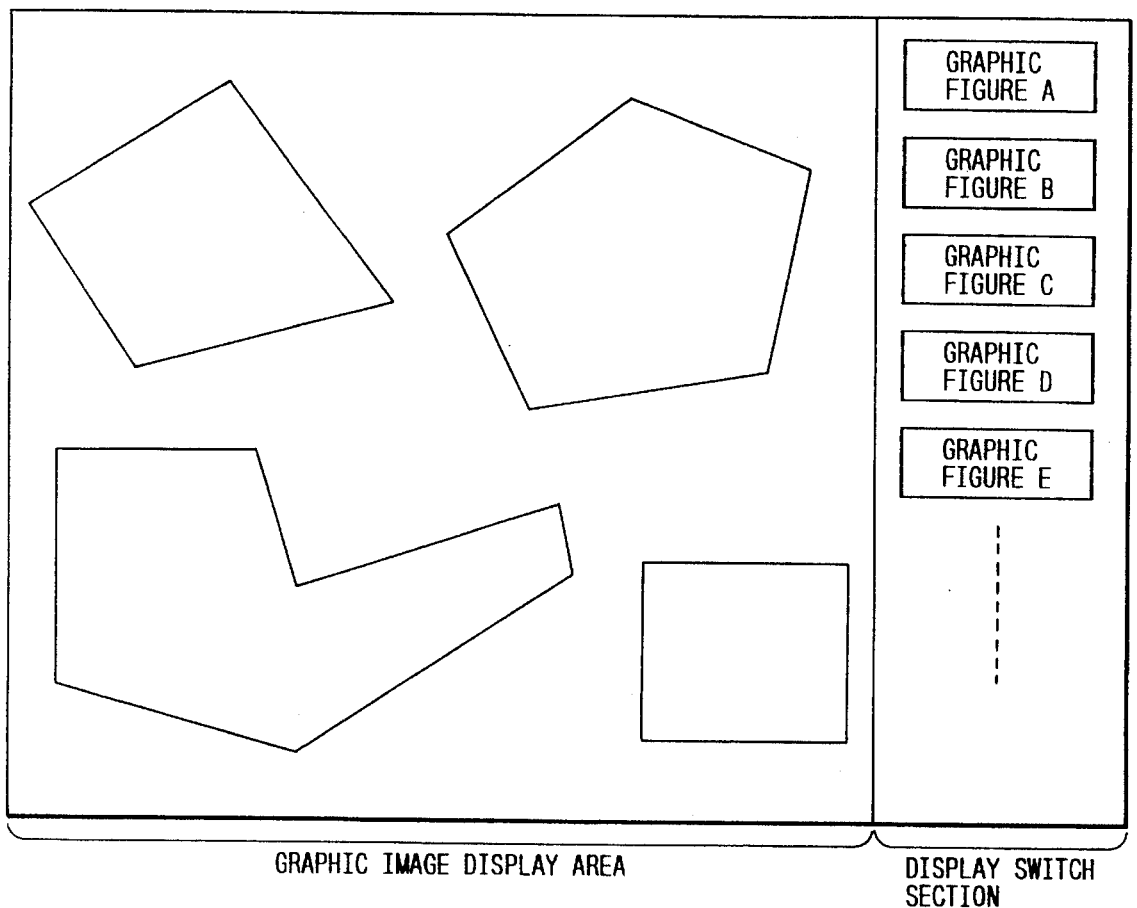
FIG. 23 is a chart for illustrating a description of an example of the conventional system.

FIG. 22 is a flow chart for the graphic map drawing operations by the model Atlas.

At the step S220, the Atlas monitors the notice issued at the step S215, and, when the notice has been given, the Atlas, having received the notice, adds the icon object to the instance variable layerList upon its confirmation of the fact that the particular icon is a MapLayerIcon, and explicitly displays the icons transferred to the upper right corner of the ScrollView (the step S221).

Then, the Atlas gives notice on the graphic image (map) display to the ScrollView (at the step S222).

Upon reception of the notice, the ScrollView demands the Atlas (at the step S223) to deliver the graphic image (map) to be put on display.

Upon reception of such a demand, the Atlas will prepare a condition for a combined display by examining the state of each of the MapLayer objects which the instance variable layerList collects for making a map (the step S224). That is to say, the Atlas, using a user primitive call, produces a picture (ColorForm), on which graphic images (map) to be put on display are drawn, on the basis of the setup condition (mentioned above) for the MapLayer listed up in the layerList.

The user primitive, working on the basis of the icon information (names, etc.) handed over from the Atlas, refer to graphic image files, which are substance resident on the memory device 21, and produces a bitmap depicting the graphic images (map) in accordance with the condition thus set up (the step S225).

The Atlas converts the bitmap which it has received from the user primitive into an instance of the class ColorForm of the Smalltalk-80 (at the step S226), and the ScrollView displays the graphic image picture (namely, a map) (at the step S227) which it has received from the Atlas.

The description given above covers a summary of the contents of each of the function modules formed in the Smalltalk-80 and the mechanism of their operations. The icon or graphic image display area selecting and operation instructing function 15 is already available as a function of the main body of the Smalltalk-80, and also the other function modules are similarly formed with the system classes of the Smalltalk-80 used as their super classes. For this reason, the other function modules depend mainly on the Smalltalk-80 for their fundamental functions.

The object-oriented concept of the Smalltalk-80, which can be expressed by the formula, [object=data+procedure (behavior)], can be considered to be effective for and to have a high degree of affinity with the construction of a user interface like the one in this system which explicitly works with icons representing the objects of its operations.

The present invention offers simplicity and convenience in the instructing and operating methods as applied to the overlapping display of a plural number of items of graphic attribute information and has made it easy to gain an intuitive understanding of the condition and state of the overlapping of such information items, so that the user may freely set up combinations of such items for overlapping display and obtain a natural and favorable feel of operation.

Moreover, the present invention comprises the graphic data with a plural number of graphic layers formed by the attribute of graphic images, so that the user may select any desired graphic layer with a selecting means, and, in case the selected graphic data are in a plural number, the system puts the selected graphic layers on display in their overlapping state, so that the graphic layers are thereby displayed with the same operating feel as that experienced in the overlapping display of transparency sheets with an overhead projector (OHP). The system is also enables the user to select graphic attributes and to set up a mode of display within each graphic layer, and, now that the attributes to be selected are thus arranged in an orderly hierarchical structure, the user can gain an intuitive and easy understanding of the manner of operation for graphic image display without any need of taking the complicated procedure for obtaining information for display from a graphic data sheet or experiencing the difficulty in gaining an intuitive understanding of the manner how to operate the system which the user would suffer in operating the conventional graphic image (map) data display system.

Also, the present invention has a memory means by which it stores the information on the results of display attributes as set up with a setting means, so that the information thus stored may be used at a later time, and the system according to the present invention is therefore capable of storing the information on the result of a setup of display attributes before a change is made of the setup of display attributes with respect to a given graphic layer and thereby readily returning to the setup in effect before a change thereof even after a change has been made of the setup of the display attributes. Further, with respect to those graphic image groups for display which are expected to be used frequently, this system can store information in which display attributes are set up in advance in correspondence with the respective displays, so that a display of a graphic image can be done on the basis of the setup information thus stored in memory, without the trouble of setting up the desired display attributes one by one, and this system can attain improvements on the operating efficiency in this manner. Furthermore, the present invention can construct a system in such a manner that it can copy not only the setup information, but also the data on the graphic layers, and the system can therefore achieve greater abundance of data on the graphic layers and greater diversification of the graphic images which it can display.

Moreover, as the present invention takes the objects in the explicit form of icons as the objects of its operations, the system according to the present invention features a high degree of affinity with the object-oriented concept which is expressed by the formula, [object=data+procedure (behavior)] and is capable of constructing a user interface effectively. Also, the conventional system requires that all the conditions should be set up afresh in order to restore the system to the setup in effect before a change thereof after a change has been made of the setup of the display condition. However, the system according to the present invention is capable of storing icons representing the graphic information, it is possible for the system to resume the setup in effect prior to a change only by an operation of a proper icon even after a change has already been made of the setup, provided that the icon is stored in advance.

What is claimed is:

1. A graphic pattern displaying system, comprising:

first memory means for storing graphic data having a plurality of graphic layers composed of a plurality of graphic elements having assigned graphic element type attributes, said graphic element type attributes indicating types of said graphic elements, said types being predefined for each of said graphic layers;

displaying means for displaying said graphic data; selecting means for selecting the plurality of graphic layers to be displayed on said displaying means;

setting means for each of said plurality of graphic layers for setting display attributes when graphic elements on the plurality of graphic layers selected by the selecting means are displayed on said displaying means in superposition in response to an AND operation of the graphic layers; and display control means for reading the plurality of graphic layers selected by said selecting means from said first memory means and for displaying the graphic layers in superposition relationship on a display screen of said displaying means in response to an AND operation on the basis of a result of setting by said setting means.

2. A graphic pattern displaying system according to claim 1, further comprising means for forming icons corresponding to the respective graphic layers, means for displaying the icons on the displaying means, and means for correlating the setting result of the setting means with the corresponding icon, wherein the selecting means selects the displayed icon to select the graphic layer, and the display control means displays the selected graphic layer in superposition in response to an AND operation of the graphic layers through the selected icon.

3. A graphic pattern displaying system according to claim 1, wherein said selecting means includes a user interface for displaying on said display screen of said display means a graphic layer and for enabling a user by means of a painting device to indicate an icon corresponding to a desired graphic layer and transferring said indicated icon to said graphic image displaying area.

4. A graphic pattern displaying system according to claim 1, wherein said setting means includes a user interface for displaying a display attribute setting window on said display screen, said display attribute setting window being openable for each of said graphic layers, for displaying attribute information on said graphic element type attributes possessed by said graphic layers and having buttons for selecting whether or not said graphic element having said graphic element type attributes should be put on display in a graphic image display area, so that a user may perform a display setting operation by indicating with a pointing device a desired one of said buttons.

5. A graphic pattern displaying system according to claim 1, wherein said setting means includes a user interface for displaying a display attribute setting window on said display screen, said display attribute setting window being openable for each of said graphic layers, displaying attribute information on said graphic element types attributes possessed by said graphic layers, and having buttons for selecting a form of display for displaying said graphic element having said attributes in a graphic image display area, so that a user may perform a display setting operation by indicating with a pointing device a desired one of said buttons.

6. A graphic pattern displaying system according to claim 5, wherein each of said graphic element type attributes have different colors as the form of display of said graphic elements.

7. A graphic pattern displaying system according to claim 4, 5, or 6, wherein said user interface includes means for copying and storing an icon having information on the result of a setup of said display attributes by said setting means for display of said graphic layer.

8. A graphic pattern displaying system according to claim 1, wherein said display control means includes a software module constructed to control the plurality of graphic layers with a layer object expressed in an object oriented language and with a layer icon object as subclasses of said layer object.

9. A graphic pattern displaying system according to claim 8, wherein said layer object has first internal information for specifying said graphic layers, said layer icon object has second internal information for specifying the state of said layer icon object and said display attributes, and said layer object and said layer icon object furnish said first and second internal information in response to a message from said display control means.

10. A graphic pattern displaying system according to claim 9, wherein said display control means contains a software module composed of an object expressed in an object-oriented language for display of a graphic image, said graphic layer is depicted on said graphic image display area in accordance with said first and second internal information of said layer object and said layer icon object by said software module.

11. A graphic pattern displaying system according to claim 10, wherein said display control means displays a reduced-icon indicating a given graphic layer on said graphic image display at times when said given graphic layer is depicted on said graphic image display.

12. A graphic pattern displaying system according to claim 1, wherein said graphic element type attribute as a constituent element of said graphic data is turned into a polygonal structure.

13. A graphic pattern displaying system according to claim 1, wherein said graphic data is map information, and desired map information is displayed by providing said plurality of graphic layers for every desired category of said graphic elements to be represented on a map and by, furnishing said graphic elements to be placed in said respective graphic layers with a plurality of sub-categories and by selectively overlapping said graphic layers, and also by setting up said display attributes for said graphic elements in said sub-categories of said respective plurality of graphic layers.

14. A graphic image displaying method, comprising:

preparing graphic data having a plurality of graphic layers composed of a plurality of graphic elements having graphic element type attributes, said graphic element type attributes indicating types of said graphic elements, said types being predefined for each of said graphic layers;

controlling said graphic layers for display on a displaying means;

setting display attributes for said graphic element type attributes after controlling said one of said graphic layers for display on said displaying means in superposition in response to an AND operation of the plurality of graphic layers on said displaying means; and displaying said graphic layers selected in their superposition state on a display screen of said displaying means in response to an AND operation in accordance with a result of said step of setting up.

15. A graphic image retrieving system, comprising:

first memory means for storing graphic data having a plurality of graphic layers composed of a plurality of graphic elements having graphic element type attributes, said graphic element type attributes indicating types of said graphic elements, said types being predefined for each of said graphic layers;

means for displaying the plurality of graphic layers;

selecting means for selecting the plurality of graphic layers;

setting means provided for each of said plurality of graphic layers and for setting display attributes for said graphic element type attributes after selecting said graphic layers, for selecting graphic elements to be retrieved on said respective plurality of graphic layers in response to an AND operation of the graphic layers; and retrieving means for retrieving said graphic elements in superposition on said graphic layers selected with said selecting means on the basis of the result of a setup made with said setting means.

16. A graphic image retrieving system according to claim 15, wherein said retrieving means finds the result of a retrieval by taking a logical product for said respective graphic layers.

17. A graphic image retrieving system according to claim 15, further comprising a displaying means for displaying the result of a retrieval performed by said retrieving means.

18. A graphic image retrieving system according to claim 15 further comprising a second memory means for storing the results of a retrieval performed by said retrieving means.

* * * * *

UNITED STATES PATENT AND TRADEMARK OFFICE
CERTIFICATE OF CORRECTION

PATENT NO. : 5,553,211
DATED : September 03, 1996
INVENTOR(S) : Akira UOTANI

It is certified that error appears in the above-indentified patent and that said Letters Patent is hereby corrected as shown below:

Claim 3, column 18, line 40, after "graphic", insert --image displaying area and an icon corresponding to a graphic--.

Claim 3, column 18, line 41, "painting" should read --pointing--.

Claim 17, column 20, line 46, after "comprising", delete "a".

Signed and Sealed this

Seventeenth Day of December, 1996

*Attest:*

BRUCE LEHMAN

*Attesting Officer*     *Commissioner of Patents and Trademarks*